US011082209B2

(12) United States Patent
Locketz

(10) Patent No.: US 11,082,209 B2
(45) Date of Patent: *Aug. 3, 2021

(54) DEVICE UPDATE TRANSMISSION USING A FILTER STRUCTURE

(71) Applicant: INTEGRITY Security Services LLC, Santa Barbara, CA (US)

(72) Inventor: Neil Locketz, Irvine, CA (US)

(73) Assignee: INTEGRITY SECURITY SERVICES LLC, Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/156,859

(22) Filed: Jan. 25, 2021

(65) Prior Publication Data

US 2021/0176048 A1 Jun. 10, 2021

Related U.S. Application Data

(63) Continuation-in-part of application No. 16/868,583, filed on May 7, 2020, which is a continuation of
(Continued)

(51) Int. Cl.
*H04L 9/06* (2006.01)
*G06F 8/65* (2018.01)

(52) U.S. Cl.
CPC .............. *H04L 9/0643* (2013.01); *G06F 8/65* (2013.01)

(58) Field of Classification Search
CPC .............. H04L 9/0643; H04L 63/0245; H04L 63/0263; H04L 12/4633; H04L 12/66;
(Continued)

(56) References Cited

U.S. PATENT DOCUMENTS

| 9,641,343 | B1 | 5/2017 | Roskind |
| 10,476,697 | B2 * | 11/2019 | Zheng ................. H04L 12/6418 |
| 10,552,313 | B2 * | 2/2020 | Bar-Joshua ........... G06F 1/3275 |
| 2006/0294311 | A1 * | 12/2006 | Fu .......................... G06F 16/951 711/118 |
| 2008/0212111 | A1 | 9/2008 | Masuda |

(Continued)

OTHER PUBLICATIONS

Anonymous, "Bloom filter—Wikipedia", May 2, 2019, XP055726698, https://en.wikipedia.org/w/index.php?title=Bloom_filter&oldid= 895163114, retrieved Sep. 1, 2020, 19 pages.

(Continued)

*Primary Examiner* — Abiy Getachew
(74) *Attorney, Agent, or Firm* — MH2 Technology Law Group LLP

(57) ABSTRACT

A system includes a campaign management service to detect a campaign initiation request indicating a number of computerized devices to be updated for a campaign and store data corresponding to the computerized devices to be updated. The campaign management service can generate a filter data structure comprising hash values based on the data for each of the computerized devices to be updated and transmit the filter data structure to a network edge. The system can include the network edge that can use the filter data structure from the campaign management service to determine whether a computerized device is to obtain a device update from the campaign management service. The network edge can retrieve the device update and modify the computerized device by transmitting the device update to the computerized device, which then installs it.

24 Claims, 8 Drawing Sheets

Related U.S. Application Data application No. 16/437,344, filed on Jun. 11, 2019, now Pat. No. 10,666,427.

(58) Field of Classification Search
CPC . H04L 45/70; H04L 63/0227; H04L 63/0272; H04L 63/029; H04L 47/20; H04L 61/1511; H04L 63/1458; H04L 63/20; H04L 2463/142; H04L 41/16; H04L 43/022; H04L 43/04; H04L 43/065; H04L 47/2483; H04L 61/305; H04L 63/02; H04L 63/0236; H04L 63/1408; H04L 63/1483; H04L 67/12; G06F 8/65; G06F 16/137; G06F 16/152; G06F 16/2282; G06F 16/2453; G06F 16/289; G06F 16/325; G06N 20/00; H04W 4/70

See application file for complete search history.

(56) References Cited

U.S. PATENT DOCUMENTS

| | | |
|---|---|---|
| 2010/0228701 A1* | 9/2010 | Harris, III ............... H04L 51/12 707/683 |
| 2017/0154099 A1* | 6/2017 | Chen ..................... G06F 16/325 |
| 2017/0373855 A1 | 12/2017 | Pritchard |
| 2018/0275982 A1 | 9/2018 | Hunt et al. |
| 2019/0149342 A1 | 5/2019 | Fynaardt et al. |

OTHER PUBLICATIONS

Stefan Kamps, Extended European Search Report dated Nov. 10, 2020, EP Application No. 20179522, pp. 1-17.
Google Scholar, Device Update Transmission Using a Bloom Filter, May 25, 2020, 2 pages.
ip.com, InnovationQ Plus, May 25, 2020, 1 page.

* cited by examiner

DEVICE UPDATE TRANSMISSION USING A FILTER STRUCTURE

CROSS-REFERENCE TO RELATED APPLICATIONS

This application is Continuation in Part of U.S. application Ser. No. 16/868,583 filed on 7 May 2020, which is a Continuation of U.S. application Ser. No. 16/437,344 filed on 11 Jun. 2019, now issued as U.S. Pat. No. 10,666,427, which are hereby incorporated by reference in their entirety.

TECHNICAL FIELD

This disclosure relates generally to systems, devices, and methods for securely providing device updates. More particularly, the disclosure relates to improved systems, devices, and methods for providing device updates to computerized devices that are included in an update campaign, such as the computerized devices in V2X vehicles.

BACKGROUND

As computers have become miniaturized and commoditized, manufacturers are producing more varied devices that include any number of embedded computers and processors. The computer in a computerized device can control the device's operation; collect, store, and share data; communicate with other computers and other computerized devices; and update its own software, among other things.

The Internet of Things (IoT) is the network of computerized physical devices that have embedded processor(s), electronics, software, data, sensors, actuators, and/or network connectivity, which enable these devices to connect and exchange data via digital networks, including the Internet, cellular networks, and other wireless networks. Typically, each "thing" is uniquely identifiable through its embedded computing system, and is able to inter-operate within the existing Internet infrastructure. "Things", in the IoT sense, can refer to a wide variety of computerized devices, such as consumer appliances, enterprise devices used in business and corporate settings, manufacturing machines, farming equipment, energy-consuming devices in homes and buildings (switches, power outlets, appliances, lighting systems, bulbs, televisions, garage door openers, sprinkler systems, security systems, etc.), medical and healthcare devices, infrastructure management devices, robots, drones, and transportation devices and vehicles, among many others.

In many examples, modern vehicles and transportation machinery (e.g., automobiles, trucks, aircraft, trains, watercraft, motorcycles, scooters, and the like) contain several embedded processors or embedded computers in their subsystems, and are computer-controlled in at least some aspects. Similarly, a growing number of modern transportation infrastructure devices (e.g., traffic lights, traffic cameras, traffic sensors, bridge monitors, bridge control systems, and the like) contain at least one, and often many, embedded processors or embedded computer systems, and are computer-controlled in at least some aspects. These computer-controlled elements of the transportation network typically communicate with each other, passing various types of information back and forth, and they may react, respond, change their operation, or otherwise depend upon and use the information received/sent from/to other vehicles in Vehicle-to-Vehicle (V2V; also known as Car-to-Car (C2C)) communications and/or from/to infrastructure elements in Vehicle-to-Infrastructure (V2I; also known as Car-to-Infrastructure (C2I)) communications for safe, correct, efficient, and reliable operation. Together, the V2V and V2I systems are commonly referred to as the V2X system or infrastructure.

The computers in computerized devices operate according to their software and/or firmware and data. In order to ensure safe and proper operation, the computerized devices must be properly initialized and updated with the proper software, firmware, executable instructions, digital certificates (e.g., public key certificates), cryptographic keys and the like (hereinafter collectively referred to as "digital assets" or "software") as intended by the manufacturer, so that the IoT consists of devices that are executing authorized, known-to-be-good software and data. Problems arise, however, when unauthorized persons or organizations (e.g., hackers) replace or change the software in computerized devices. Problems also arise when older software, untested software, unapproved software, and/or software with known bugs is installed in computerized devices.

Conventional systems can require a significant allocation of hardware and other resources to process device update requests for "campaigns" that include a large number of devices, such as a campaign to update the software for all of the V2X-capable cars that are of a specific make, model, and year, and/or that have a specific digital asset (e.g., one of a specific set of certificates), which may amount to tens or hundreds of thousands of cars. For example, conventional systems processing device update requests for large campaigns require a large amount of memory, processors, network bandwidth, and the like in order to process all of the requests, which include requests from the set of devices that are part of the campaign (e.g., cars that are of a specific make, model, year, and/or certificate group) interspersed with requests from devices that are not part of the campaign (e.g., cars that are part of the V2X environment, but are not of the campaign's specific make, model, year, and/or certificate set). The campaigns, as referred to herein, can include device updates for a particular group of computerized devices, wherein the devices updates can include software updates, firmware updates, and the like.

Some conventional systems can use linear searches or binary searches to determine whether or not a computerized device should receive a device update as part of a campaign—for example, to determine whether a requesting car is in the specific set of make(s), model(s), year(s) and/or certificate(s) included in the campaign. However, linear searches and binary searches typically require storing a large amount of data and searching the data typically requires a substantial amount of processing time and power. Additionally, the amount of time required to complete each such search grows according to the number of devices (e.g., cars) in the campaign. Therefore, conventional systems can result in a significant delay or latency when determining whether a computerized device is included in a campaign for device updates, such as a delay of five seconds or more per device/request.

In some embodiments, the present techniques include improved systems, devices, and methods that can verify that a computerized device belongs to a campaign or group or set of computerized devices that are scheduled to receive device updates. In some implementations, the present techniques include a system that can reduce the hardware resources and time used to determine whether a computerized device is included in a campaign and retrieve a device update as part of the campaign.

SUMMARY

Accordingly, the present techniques include improved systems, devices, and methods that can provide updates to computerized devices. In some embodiments, a system for providing updates to computerized devices, is provided. The system includes a campaign management service comprising computer-executable instructions that cause a first processor to perform operations including detecting a campaign initiation request indicating a set of computerized devices to be updated for a campaign, generating a filter data structure comprising a plurality of hash values, the plurality of hash values corresponding to the set of computerized devices to be updated, wherein a number of hash functions are used to generate the plurality of hash values for the filter data structure, and providing the filter data structure, generated based on the number of hash functions, from the campaign management service to a network edge. The network edge includes computer-executable instructions that cause a second processor to perform operations including determining that a computerized device is to receive a device update from the campaign management service based on a result returned by the filter structure in response to identifying information provided by the computerized device, the result being based on a membership test performed using one or more of the hash functions of the filter data structure and the identifying information, obtaining the device update associated with the computerized device from the campaign management service in response to the campaign management service confirming that the computerized device is a member of the campaign, wherein the device update comprises a digital asset comprising one or more of: software, firmware, or a digital certificate, wherein the digital asset modifies operation of the computerized device, and providing the device update to the computerized device, whereby the device update modifies the computerized device.

The filter data structure may be a cuckoo filter data structure.

The cuckoo filter data structure may be a semi-sorted cuckoo filter data structure.

The filter data structure may be an Xor filter data structure.

In an embodiment, the network edge further includes computer-executable instructions that cause a second processor to perform operations including determining, using the filter data structure, that the computerized device does not belong to the campaign; and providing, to the computerized device and without communicating with the campaign management service, an indication that there is no device update for the computerized device.

In an embodiment, the computerized device is an internet of things (IoT) device, a consumer appliance, or a vehicle.

In an embodiment, the device update can include an enrollment certificate or a pseudonym certificate.

In an embodiment, the device update can include software or firmware to be installed on the computerized device.

In an embodiment, the device update can include installation information or an installation script.

In an embodiment, the campaign management service further includes computer-executable instructions that cause the first processor to perform operations that include storing data corresponding to the computerized devices to be updated.

In an embodiment, the data can include one or more of: a campaign start date, a campaign end date, a plurality of vehicle identification numbers, a plurality of product serial numbers, and a product model number.

In an embodiment, the campaign management service further includes computer-executable instructions that cause a first processor to perform operations including determining whether the computerized device is in the campaign by accessing the data.

In an embodiment, the filter data structure is a constant size regardless of the number of computerized devices in the set.

In an embodiment, generating the filter data structure can include adjusting a number of hash functions that generate the hash values for the filter data structure based on a false positive rate threshold.

In an embodiment, the system enables the computerized device to poll the network edge for the device update as the filter data structure is generated.

In an embodiment, the campaign management service further comprises computer-executable instructions that cause a first processor to perform operations including directing the network edge to delete the filter data structure at an end of the campaign.

In an embodiment, each computerized device in the set of computerized devices includes a uniform resource locator for communicating with the network edge.

According to further embodiments, a network edge device is provided. The device includes computer-executable instructions that cause a processor to perform operations including obtaining, from a campaign management service, a filter data structure comprising a plurality of hash values, wherein a number of hash functions generate the plurality of hash values for the filter data structure, determining that a computerized device is to receive a device update from the campaign management service based on a result returned by the filter structure in response to identifying information provided by the computerized device, the result being based on a membership test performed using one or more of the hash functions of the filter data structure and the identifying information, and transmitting a device update request corresponding to the computerized device to the campaign management service, obtaining the device update associated with the device update request from the campaign management service after the campaign management service confirms that the computerized device is a member of the campaign. The device update includes a digital asset comprising one or more of software, firmware, or a digital certificate, and the digital asset modifies operation of the computerized device. The operations further include providing the device update to the computerized device, whereby the computerized device installs the device update.

The filter data structure may be a cuckoo filter data structure.

The cuckoo filter data structure may be a semi-sorted cuckoo filter data structure.

The filter data structure may be an Xor filter data structure.

In an embodiment, a campaign management service can include computer-executable instructions that cause a processor to perform operations including detecting a campaign initiation request specifying a plurality of computerized devices to be updated with a device update for a campaign. The operations can also include storing data corresponding to the plurality of computerized devices to be updated and generating a filter data structure comprising a plurality of hash values, wherein each hash value is based on the data for each of the computerized devices in the plurality of computerized devices. Furthermore, the operations can include providing the filter data structure to a network edge and receiving a request for the device update from a computerized device. In addition, the operations can include confirming that the computerized device is a member of the campaign based on the data corresponding to the plurality of computerized devices to be updated. Moreover, the operations can include providing the device update associated with the request to the network edge, the device update to modify electronic data accessed or stored by the computerized device.

The filter data structure may be a cuckoo filter data structure.

The cuckoo filter data structure may be a semi-sorted cuckoo filter data structure.

The filter data structure may be an Xor filter data structure.

BRIEF DESCRIPTION OF THE DRAWINGS

The accompanying drawings, which are incorporated into and constitute a part of this specification, illustrate examples of numerous features of the disclosed subject matter. The accompanying drawings, together with the description, serve to explain the principles of the various techniques described herein.

DETAILED DESCRIPTION

Reference will now be made in detail to various implementations of the techniques described herein, examples of which are illustrated in the accompanying drawings. Wherever convenient, the same reference numbers will be used throughout the drawings to refer to the same or like parts.

A growing number of devices, sensors, and appliances, among others, are including additional hardware components such as networking components. The networking components can enable the various devices to communicate with any number of external devices, servers, and the like. In some examples, the software and firmware used to operate the devices can become outdated or unsecure. Accordingly, the devices can request device updates via the networking components to improve the performance of the devices and prevent security issues. In some embodiments, the devices are updated in groups or campaigns. The campaigns can enable a manufacturer or any other suitable entity to provide device updates to a set of devices. In some examples, the devices can periodically poll an external server or service to determine whether there are updates available for the devices, (e.g., whether there is an active campaign that includes the device) and/or determine whether the devices can retrieve device updates.

In various implementations, the device updates can include updates for automotive components at a time after they are manufactured and initialized. For example, to ensure safe and proper operation in the field, embedded devices, for instance, the Electronic Control Units (ECUs) used in vehicles, can be initialized during manufacturing by provisioning digital assets, such as security assets. Digital assets can include various digital certificates, cryptographic keys, a unique identifier, and software. In some examples, a CMS or a certificate management service generates these digital assets and a secure provisioning system distributes the digital assets to manufacturing factories.

Generally (but not always) after leaving the factory and being deployed into service, a device update may be requested by the computerized device to retrieve new or replacement software, firmware, digital assets, and the like, which enable the computerized device to function correctly or in a revised manner. In some embodiments described, computerized devices can request device updates and the requests can be filtered using one of a bloom filter data structure, a cuckoo filter data structure, and/or an Xor filter data structure, among others. Various embodiments utilizing such data structures provide a determination regarding whether or not a computerized device is to receive a device update in an approximately constant amount of time that is less than the time needed by conventional systems, while utilizing a reduced amount of storage and computing power when compared to conventional systems.

Figure 1:
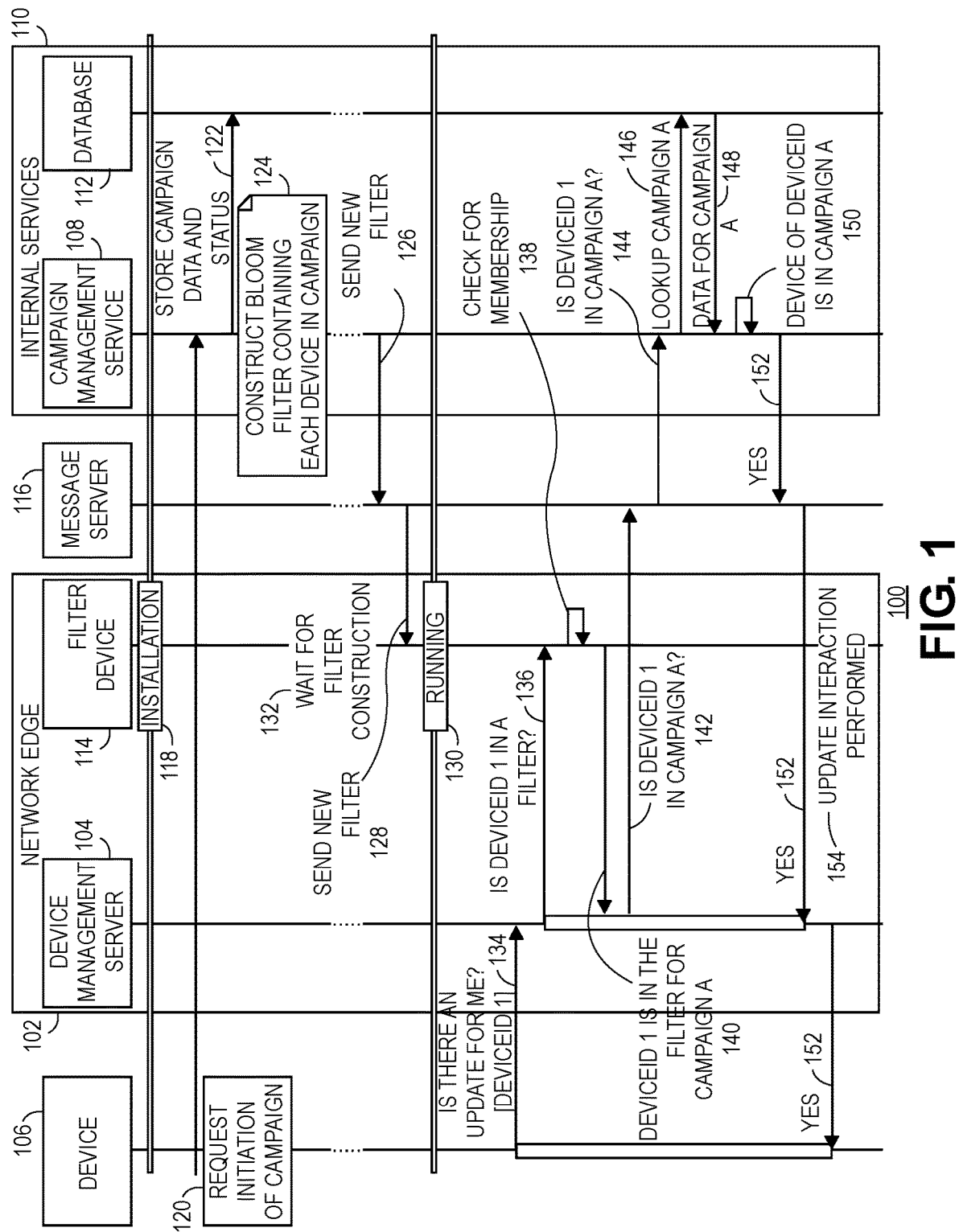
FIG. 1 is a block diagram of an example operating environment for a computerized device, network edge, and campaign management service, consistent with example embodiments described herein.

FIG. 1 is a block diagram of an example operating environment for a computerized device, network edge, and campaign management service that can process requests for device updates. In some embodiments, the system 100 can be implemented with any suitable computing device, server, external remote service network, and the like. As shown in this example, the system 100 can include a network edge 102, a device management server 104, a device 106, a campaign management service 108, internal services 110, a database 112, a filter device 114, and a message server 116, among others. Notably, the terms "computerized device" and "computing device" are used interchangeably herein, and shall be understood to mean any device capable of performing one or more digital operations, such as, for example, data manipulation, network communications, information parsing, etc.

In some implementations, the network edge 102 can include a device management server 104 that can implement initialization 118 of a campaign for device updates, and the like. The campaign can specify or include any set, group, or number of devices (also referred to herein as computerized devices) 106 that are to retrieve device updates, such as software updates, firmware updates, or new applications, among others. In some embodiments, the device updates can include installation information or an installation script associated with software, firmware, or any combination thereof, to be stored in the device 106. The installation information can indicate directories or locations to store the device update within the memory of a device 106. The installation scripts can include executable instructions for installing the device update.

In some embodiments, the device 106 can be an internet of things (IoT) sensor, a consumer appliance, a vehicle, or a device that is part of a vehicle (e.g., an OBU or the like), among others. For example, the device 106 can include a vehicle, a watercraft (e.g., a boat), an aircraft, a spacecraft, a medical device, a robot, a drone, a wireless or wired communication module, or an IoT device. In some examples, the device 106 can correspond to an RSU of a traffic control device (e.g., a traffic signal, a traffic light, or electronic traffic signage), a digital billboard, a pedestrian warning system, a motorcycle sensor, a bicycle sensor, an electronic sign, a street light sensor, or a construction warning sensor, among others.

In some examples, the device management server 104 can detect 120 a campaign initiation request (not shown) from a web interface, an external server, or a device 106. In some implementations, the device management server 104 can detect the campaign initiation request from a server or a device that manages campaigns. The device management server 104 can then forward the campaign initiation request to a campaign management service 108, which can belong to internal services 110 that include any number of computing devices such as servers, databases, client devices, and the like. In some embodiments, the internal services 110 can detect the campaign initiation request through any suitable interface that bypasses transmitting campaign related data via the device management server 104. The campaign initiation request can indicate a list or set of devices 106 to be updated as part of a device update campaign. In some examples, the campaign initiation request can include a set of device identifiers or a set of identifying information for each device, such as a set of serial numbers, a set of product names, a set of internet protocol (IP) addresses, a set of media access control (MAC) addresses, or the like, along with a time to begin the device updates, a time to end the device updates, and/or optionally other information specifying the parameters of the campaign.

In some embodiments, the campaign management service 108 can determine that the campaign is to be initiated. In some examples, initiating the campaign can include storing 122 campaign data and a status in a database 112 of the internal services 110. The campaign data stored in the database 112 can include the information from the campaign initiation request such as a set of serial numbers, a set of product names, a set of internet protocol (IP) addresses, a set of media access control (MAC) addresses, some other set of device-identifying information, a time to begin the device updates, a time to end the device updates, and the like. In some examples, the status of the campaign stored in the database 112 can indicate if a campaign has begun or if the campaign is inactive until a later time. In some embodiments, the database 112 can store data locally within the campaign management service 108 or the database 112 can be an externally located database 112 accessed via a network connection (not shown).

In some embodiments, the campaign management service 108 initializes 124 a data structure for the campaign prior to processing device update requests for the campaign. The data structure can include a bloom filter data structure, a linked list, a multi-dimensional array, a cuckoo filter data structure, an Xor filter data structure, or any other data structure that may be used to quickly identify devices 106 and/or requests 134 that are included in or correspond to the campaign, (e.g., devices that are in the list or set of device identifiers from the campaign initiation request).

In some examples implementing a bloom filter, the bloom filter data structure is allocated as a static or constant size structure that does not expand or contract based on or according to the number of devices in the campaign, e.g., as devices are added to the campaign. In some implementations, the bloom filter data structure can include an array of hash values corresponding to the computing devices that are included in the campaign. In some embodiments, each hash value can be generated with a separate hash function. For example, each bloom filter data structure can be associated with X different hash functions. Each of the X different hash functions can map or hash identifying information for a computing device to one position within an array of the bloom filter data structure. For example, to add a computing device to the bloom filter data structure, identifying information for the computing device is provided to each of the X different hash functions. Each of the X different hash functions generates an output value corresponding to an array position. The array of the bloom filter data structure can be modified to store a one value for each array position that is generated as output by the X different hash functions. In one example, identifying information for a computerized device can be provided to five hash functions, which each generate separate array position values. The bloom filter data structure can be modified to store a binary value, or any other suitable value, in each array position mapped to the output of the five hash functions. Accordingly, five array positions of the bloom filter data structure can store a 1 value after a computerized device is mapped to the bloom filter data structure.

The number of hash functions that map hash values to the array of the bloom filter data structure can be based on a false positive rate threshold. For example, reducing the number of hash functions as compared to the number of entries in the array of the bloom filter data structure can reduce the false positive rate. By contrast, increasing the number of hash functions used to map hash values to the array of the bloom filter data structure can increase the false positive rate. In some examples, the campaign management service 108 can adjust a number of hash functions that generate the hash values for the bloom filter data structure based on a false positive rate threshold.

According to illustrative examples implementing a cuckoo filter data structure, the cuckoo filter data structure is allocated as a variable size structure that may be expanded based on or according to the number of devices in the campaign, e.g., as devices are added to the campaign. According to some embodiments, the cuckoo filter data structure may be implemented as a two-table structure.

In some implementations, the cuckoo filter data structure can include an array of hash values corresponding to the computing devices that are included in the campaign, the hash values being generated based on a key corresponding to identifying information from each computing device. For example, each cuckoo filter data structure can be associated with two different hash functions. Each of the two different hash functions can map or hash identifying information for a computing device (i.e., the key) to a 1 at a position within an array of the cuckoo filter data structure. For example, to add a computing device to the cuckoo filter data structure, identifying information for the computing device is provided to each of the two different hash functions. Each of the two different hash functions generates an output value corresponding to an array position within a table, and in a two-table implementation, each hash function provides a location in one of the two tables.

The array of the cuckoo filter data structure is modified to store a value for each array position that is generated as output by the two different hash functions. The cuckoo filter data structure can be modified to store a binary value, or any other suitable value, in each array position mapped to the output of the two hash functions. Accordingly, two array positions of the cuckoo filter data structure can store a 1 value when a computerized device is mapped to the location in the cuckoo filter data structure.

According to illustrative examples in which an Xor filter structure is implemented as the data filter structure, the Xor filter data structure is allocated as a static size structure and the number of devices in the campaign, as well as their identities, are known and fixed prior to generation of the Xor filter data structure. In other words, the set of computing devices in any given campaign for which an Xor filter structure is implemented is a closed set.

In some implementations, the Xor filter data structure can be created by first choosing a random hash function with which a plurality of fingerprints can be generated. The fingerprints can be generated using a key corresponding to identifying information of the computing device and randomly selected hash function, and then stored in locations of an array in the Xor filter data structure.

A plurality of hash functions independent (i.e., distinct) from the hash function chosen for generating the fingerprints may then be iteratively tested against the generated set of fingerprints to determine three hash functions. For example, each of three different hash functions maps identifying information for a computing device (e.g., the key) to a position within the array containing the generated fingerprints. Each of the three different hash functions being tested generates an output value corresponding to an array position within the array of fingerprints. The hash functions selected can be determined to be suitable when an Xor aggregate of the fingerprint values at the three locations resulting from the tested hash functions are equal to the actual stored fingerprint value across the entire closed set of computing devices. Iterations continue until three suitable hash functions producing the agreement are determined. The determined three or more hash functions are then stored in the Xor filter data structure for use in campaign membership determination.

In some embodiments, the campaign management service 108 can transmit 126 the implemented filter data structure (e.g., bloom filter data structure, cuckoo filter data structure, Xor data structure, etc.) to a filter device 114 via a message server 116. For example, the message server 116 can enable synchronously or asynchronously providing 128 the filter data structure to the filter device 114. In some examples, where a bloom or cuckoo filter data structure are implemented, the network edge 102 can begin running or executing a campaign 130 by storing a cached copy of the filter data structure in the filter device 114 or the device management server 104. Thus, the network edge 102 can begin to process device update requests following the initialization of the filter data structure by storing the filter data structure within the network edge 102. In such embodiments, if a device 106 requests an update and is a member of a campaign that has not yet finished initialization of the implemented filter data structure (e.g., bloom filter or cuckoo filter), the network edge 102 will respond that the requesting device 106 has no updates available or is not part of a campaign, as is discussed in greater detail below in relation to FIG. 2. Accordingly, a device 106 can poll the network edge 102, in some examples, and wait 132 for a response indicating whether the device 106 belongs to a campaign, including polling the network edge 102 for a device update as the filter data structure is generated.

In contrast, in implementations where an Xor filter is implemented, it may be during initialization of the Xor filter for the campaign, requests from computing devices may be accepted, however, a negative result (i.e., not a member of a running campaign) may be returned until the completed Xor filter structure is sent to the network edge 102.

FIG. 1 further illustrates an example of how the system 100 processes a device update request from a device 106 that is indeed included in the campaign represented by the filter data structure, which may be referred to as a true positive. As shown in this example, a device 106 can transmit a device update request 134 to the network edge 102 after the filter data structure is initialized and the filtering process is running. The network edge 102 can query 136 the filter data structure (e.g., on the filter device 114) to determine whether or not the requesting device 106 belongs to a campaign. In some embodiments, querying 136 the filter data structure can include generating a hash value using a hash function applied to the device identifier, (i.e., the identifying information), from the device 106. The device identifier or identifying information can be or include a MAC address, IP address, serial number, and the like. In various implementations, a hash value for the identifying information of the device 106 matching a hash value stored in the filter data structure can indicate that the device 106 may belong or probably belongs to a campaign, where the hash values stored in the filter data structure were generated from the list of device identifiers included in the campaign initiation request. A match in the filter data structure does not guarantee that the requesting device 106 is part of the campaign because in various implementations the filter may produce false positives at a rate depending on the type of filter data structure implemented (e.g., bloom, cuckoo, or Xor) and a number of hash functions implemented, among others. For a bloom filter having five hash functions, a false positive rate may be about 10% or less, such as 8%, 6%, 5%, 4%, 3%, 2%, 1%, or less than 1% but greater than 0%. In some embodiments, the network edge 102 can determine 138 if a matching hash value for a device 106 is stored in the filter data structure in an approximately constant amount of time, regardless of the number of hash values (which correspond to devices) in the filter data structure (which corresponds to a campaign). Accordingly, each of the bloom, cuckoo, and Xor filter data structures provide faster processing time and use a smaller amount of memory than a conventional system when determining whether a device 106 belongs to a campaign, and these improvements grow as the number of devices in the campaign grow.

In various embodiments as shown in FIG. 1, upon looking up, comparing, or otherwise identifying a match, the filter device 114 can indicate 140 to the device management server 104 that the device 106 is a member of a campaign. The device management server 104 can then transmit 142 the device update request 134 to the campaign management service 108, for example, via a message server 116. In some examples, the message server 116 can forward 144 the device update request 134 to the campaign management service 108 asynchronously or synchronously.

In various implementations, the campaign management service 108 can detect the device update request 144/134 and query 146 the database 112 to look up or otherwise determine whether the device 106 truly belongs to the campaign, which may not be the case if the filter data structure produced a false positive. In the example illustrated in FIG. 1, the database 112 can return 148 campaign data, a status of the campaign, a list or range of devices (e.g., device identifiers), and/or other information, to the campaign management service 108. The campaign management service 108 can determine 150, in the example shown, that the device 106 is a member of the looked-up campaign and that the device 106 is to receive or be provided with a device update as part of the campaign. In some embodiments, the campaign management server 108 can return 152 an indication to the device 106 that the device 106 is a member of the campaign via the message server 116, filter device 114, and/or device management server 104, or any combination thereof. In some implementations, the campaign management service 108 returns, transmits, or otherwise provides 154 the device update data to the device 106 via the network edge 102. In various implementations, the device update data can include digital asset(s), such as software, firmware, and the like, that when executed or otherwise employed, revise or update the device 106, e.g., by modifying existing functionality, adding new functionality, removing undesirably functionality, and the like.

Accordingly, FIG. 1 represents a true positive example in which the device 106 both matches a hash value stored in the implemented filter data structure and the device 106 confirmedly belongs to the campaign. In some embodiments, the system 100 can be implemented with any number of devices. For example, the network edge 102 can be implemented with a single server, the internal services 110 can be implemented with a single server, and the system 100 may not include a message server 116 such that the network edge 102 and the internal services 110 communicate directly with each other.

Figure 2:
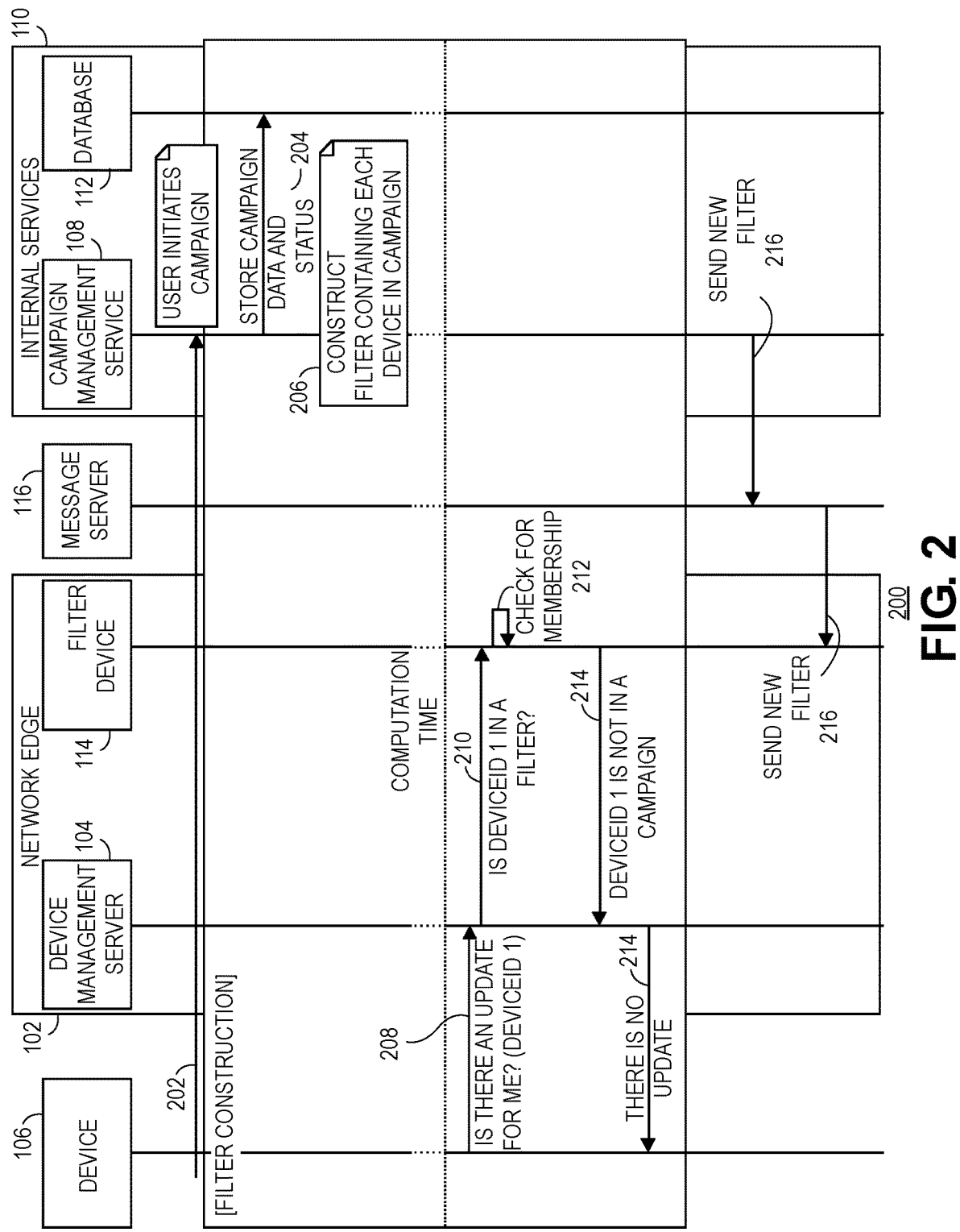
FIG. 2 depicts a block diagram of an example system that can initialize a filter data structure using a computerized device, network edge, and campaign management service, consistent with example embodiments described herein.

FIG. 2 depicts a block diagram of an example system initializing a filter data structure. In some embodiments, the system 200 can be implemented with any suitable number of computing devices such as the network edge 102, the device management server 104, the device 106, and the campaign management service 108, among others.

In some embodiments, the system can 200 can include a network edge 102 that can include a device management server 104 that can detect 202 a campaign initiation request (not shown) from a web interface, an external server, or a device 106. In some implementations, the device management server 104 can detect the campaign initiation request from a server or a device that manages campaigns. The device management server 104 can then forward the campaign request to a campaign management service 108, which can belong to internal services 110. In some embodiments, the internal services 110 can detect the campaign initiation request through any suitable interface that bypasses transmitting campaign related data via the device management server 104. The campaign initiation request can indicate a list of devices to be updated as part of a device update campaign. In some examples, the campaign request can include a set of serial numbers, a set of product names, a set of internet protocol (IP) addresses, a set of media access control (MAC) addresses, a time to begin the device updates, a time to end the device updates, and the like.

In some embodiments, the campaign management service 108 can determine that the campaign is to be initiated. In some examples, initiating the campaign can include storing 204 campaign data and a status in a database 112 of the internal services 110. The campaign data stored in the database 112 can include the information from the campaign request such as a set of serial numbers, a set of product names, a set of internet protocol (IP) addresses, a set of media access control (MAC) addresses, a time to begin the device updates, a time to end the device updates, and the like. In some examples, the status of the campaign stored in the database 112 can indicate if a campaign has begun or a subsequent time and date to start the campaign. In some embodiments, the campaign management service 108 generates 206 a data structure for the campaign prior to processing device update requests for the campaign. The data structure can include a filter data structure, a linked list, a multi-dimensional array, a cuckoo filter data structure, an Xor filter data structure, or any other data structure. In some implementations, the filter data structure can include an array of hash values corresponding to computing devices to be included in the campaign. In some embodiments, each hash value can be generated with a separate hash function.

FIG. 2 further illustrates an example of how the system 200 processes a device update request that is received from a device 106 before the filter data structure that represents the campaign is ready for use by the network edge 102, for example, when a bloom or cuckoo filter data structure is implemented. In the example shown, while the filter data structure is being generated at campaign initiation time, and/or before the filter data structure is retrieved by and installed in the network edge 102, the device management server 104 can receive or detect 208 a device update request 134 from a device 106, which will trigger a determination as to whether the device 106 belongs to a campaign. In the example shown, because the campaign management service 108 is in the process of generating 206 the filter data structure for a campaign when the request 208/134 arrives, the device management server 104 returns a response 214 indicating that there is no update for the device 106, or in other words, indicating that the device 106 is not in a campaign.

In this particular example, the device management server 104 can transmit 210 the request for the device update 208/134 from the device 106 to the filter device 114. The filter device 114 can determine 212 whether or not the device 106 has membership in a campaign by generating a hash value based on identifying information for the device 106 (e.g., a serial number, IP address, MAC address, or the like) that is included in the request 208/134. In various examples, the filter device 114 can compare the hash value for the device 106 to hash values of a generated data structure that is stored in the filter device 114 to try to identify a matching hash value. In the example of FIG. 2, the filter device 114 cannot perform any comparison because the filter device 114 does not yet have a stored filter data structure for a campaign, as the filter data structure has not yet been received from the campaign management service 108.

For this case in the embodiment shown, the filter device 114 returns 214 an exclusion response via the device management server 104 indicating that a device 106 is not in a campaign. This may occur even though the device 106 belongs to a campaign associated with the filter data structure that is concurrently being produced, constructed, or generated 206 by the campaign management service 108.

In some implementations, the device 106 may periodically poll the network edge 102 (e.g., send requests) for a device update. For example, the device 106 can transmit a request for a device update to the device management server 104 based on a predetermined time interval such as a number of minutes, hours, days, weeks, months, years, and the like. In such implementations, one or more of the poll requests 208 may arrive at the network edge 102 while the filter data structure is being generated. In some embodiments (as shown), the network edge 102 can determine that the device does not belong to the campaign and return a no-update or exclusion response 214 to the device 106 without communicating with the campaign management service 108.

As discussed above in relation to FIG. 1, the campaign management service 108 can transmit 216 the filter data structure to the network edge 102, e.g., via the message server 116, following generation of the filter data structure. In some examples, the network edge 102 can store a cached copy of the filter data structure in the device management server 104, or the separate filter device 114, for example, when a bloom or cuckoo filter data structure is implemented. In some embodiments, the network edge 102 can begin to process device update requests 134 using the filter data structure after the initialization of the filter data structure and storing of the filter data structure within the network edge 102. In various implementations, the device management server 104 can return a device update 154 to any suitable device 106 that belongs to a campaign associated with a stored filter data structure following initialization of the filter data structure.

Figure 3A:
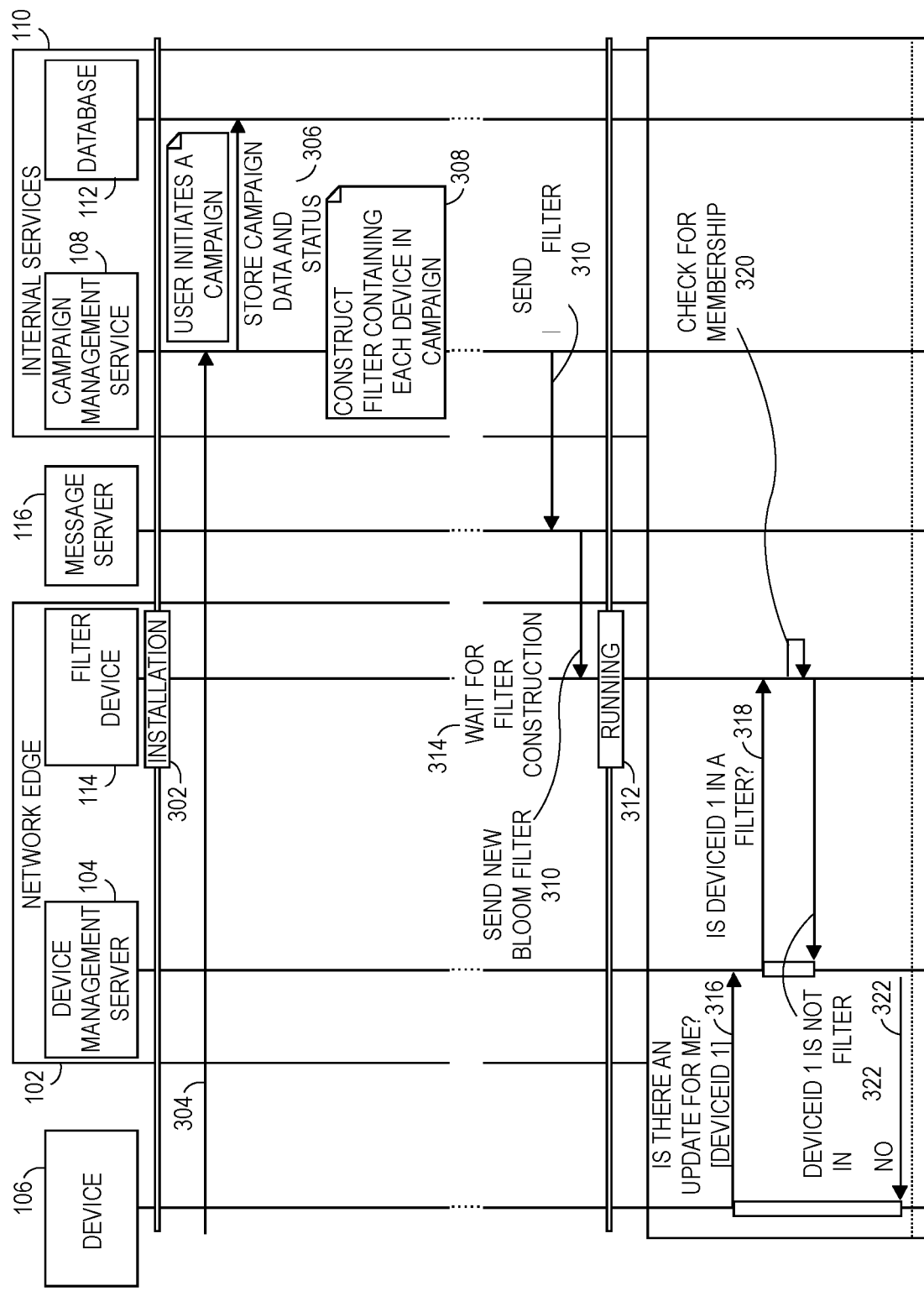
FIGS. 3A and 3B are block diagrams of an example operating environment for a computerized device, network edge, and campaign management service to process requests for device updates, consistent with example embodiments described herein.
Figure 3B:
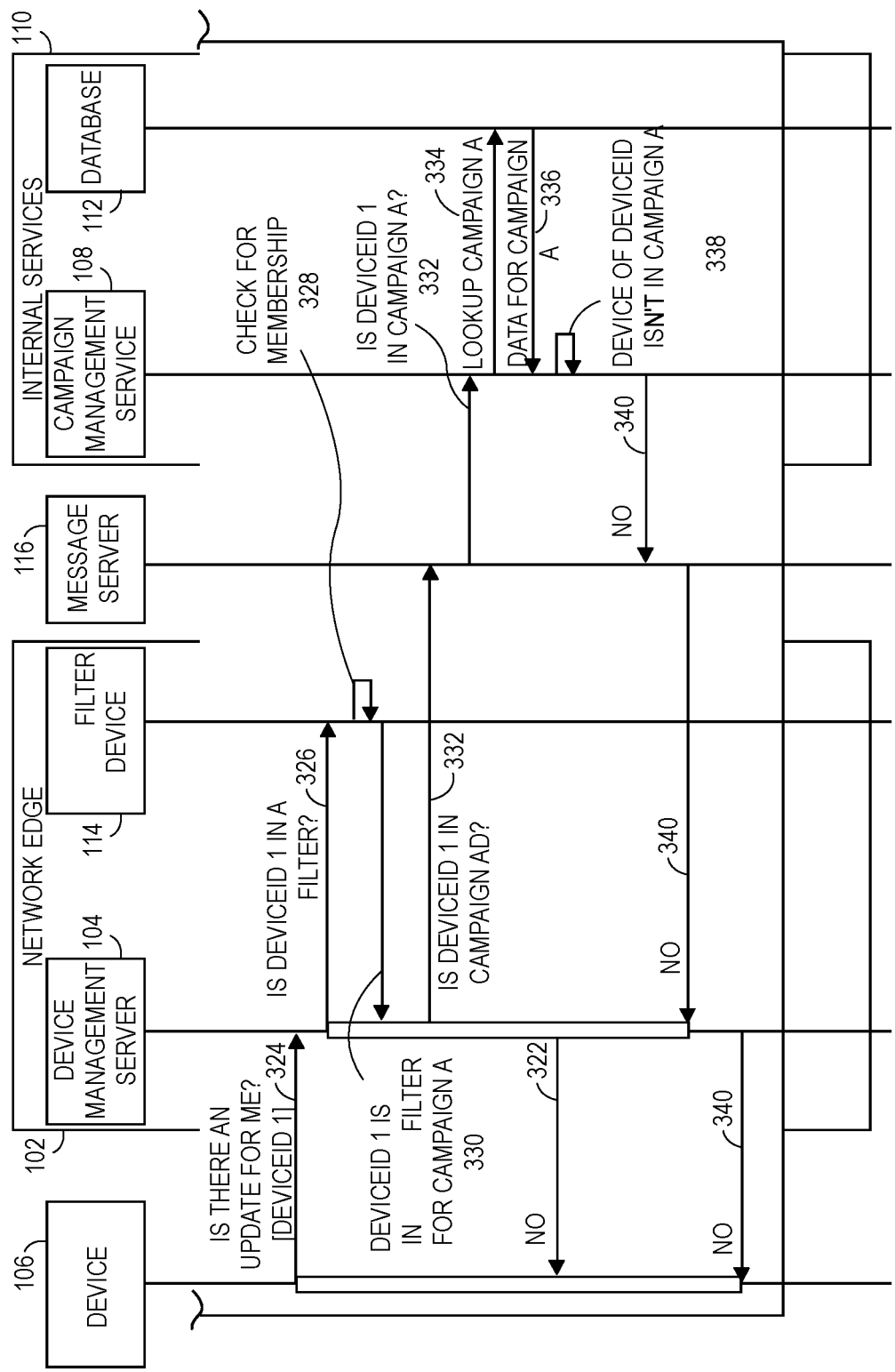

FIGS. 3A and 3B are block diagrams of an example operating environment for a computerized device, network edge, and campaign management service to process requests for device updates. In some embodiments, the system 300 can be implemented with any suitable number of computing devices such as the network edge 102, the device management server 104, the device 106, and the campaign management service 108, among others.

In the example illustrated in FIG. 3A, the filter data structure can be generated and stored as discussed above in relation to FIGS. 1 and 2. For example, any suitable external server, web based interface, computing device, and the like, can initialize 302 a campaign for device updates, and the like via an initialization request 304 transmitted to the internal services 110. In some embodiments, the campaign management service 108 can initiate the campaign by storing 306 campaign data and a status in a database 112 of the internal services 110. In some implementations, the campaign management service 108 initializes 308 a data structure, such as a filter data structure, for the campaign prior to beginning the campaign. In some embodiments, the campaign management service 108 can transmit 310 the filter data structure to a filter device 114 via a message server 116.

FIG. 3A first illustrates an example of how the system 100 processes a device update request from a device 106 that is not included in the campaign represented by the filter data structure. As shown in this example, the network edge 102 can begin implementing, running, or executing a campaign 312 by storing a copy of the filter data structure in the filter device 114 or the device management server 104. Thereafter, the network edge 102 can process device update requests with respect to campaign's information because the filter data structure representing the campaign is stored within the network edge 102. In some examples, the system 100 waits 314 until the filter data structure representing the campaign is stored within the network edge 102 before processing device requests. In some embodiments, the network edge 102 can support multiple simultaneous campaigns related to various device updates for various devices. In some such embodiments, each campaign may be represented by a separate filter data structure; while in other embodiments, a single filter data structure that is generated from the data from the multiple campaigns may be used to represent all of the campaigns in a single data structure.

In the example shown in FIG. 3A, the device management server 104 can receive or detect 316 an update request from a device 106, as described previously. The device management server 104 can, in some examples, transmit 318 the request for the device update from the device 106 to the filter device 114. The filter device 114 can determine 320 membership of the device 106 in a campaign by generating a hash value based on or using the identifying information for the device 106, which identifying information is included in the request 316. In some examples, the filter device 114 can return a result in response to identifying information provided by the computerized device, the result being based on a membership test performed using one or more of the hash functions of the filter data structure and the identifying information. For example, the filter device 114 can compare the hash value for the device 106 to hash values in the filter data structure stored in the filter device 114 to attempt to find or identify a matching hash value in the filter data structure. According to some embodiments, a match may be determined based on an aggregation of a plurality of hash functions executed on the hash value for the computing device 106 (e.g., Xor aggregation), to determine a match.

Filter data structures according to embodiments of the present disclosure (e.g., bloom filters, cuckoo filters, and Xor filters), do not generate false negatives; therefore a response indicating a lack of a matching hash value in the filter data structure indicates that the device 106 is not part of a campaign and/or does not have update data available. In the example shown, the hashed identifying information for the device 106 is not in the filter data structure, and so the filter device 114 returns a response 322 via the device management server 104 indicating that a device 106 is not in a campaign or does not have an update available at the present time.

FIG. 3B further illustrates an example of how the system 100 processes a device update request 324 from a device 106 that is not truly included in the campaign, but which appears to be according to the filter data structure representation, which may be referred to as a false positive. As noted previously, in various implementations filter data structures may produce false positives at a rate depending on the type of filter data structure implemented (e.g., bloom filter, cuckoo filter, Xor filter) and the number of hash functions used in the filter, among others. For example, a bloom filter false positive rate where five hash functions are used may be about 10% or less, such as, for example, at a rate of about 5%. The device management server 104 receives or detects a request 324 from a device 106 for an update, which can trigger a determination as to whether the device 106 belongs to a campaign. In this example, the request 324 can come from or correspond to a different device 106 than the device that issued the request 316 and that is not included in the campaign from the previous example.

The device management server 104 can, in some examples, transmit 326 the request for the device update 324 from the device 106 to the filter device 114. The filter device 114 can determine 328 membership of the requesting device 106 in a campaign by generating a hash value based on request's identifying information for the device 106 and finding in the filter data structure a hash value that is the same as the generated hash value. Upon determining that the same hash value is a member in the filter data structure, the filter device 114 returns 330 a response to the device management server 104 indicating that the device 106 is probably in a campaign (because a hash value identified in the filter data structure matched the generated hash value corresponding to the device 106).

In some implementations, the device management server 104 can transmit 332 a request for a device update for the device 106 to the campaign management service 108 via the message server 116. In some examples, the campaign management service 108 can query 334 the database 112 to look up or otherwise determine whether the device is a member of a campaign, which may not be the case if the filter data structure produced a false positive. After the database 112 returns 336 data and status information for a campaign to the campaign management service 108, in this particular example, the campaign management service 108 determines 338 that the requesting device 106 does not belong to the campaign. In some examples, the campaign management service 108 can return 340 a response indicating that the device 106 does not belong to a campaign via the message server 116, filter device 114, and/or device management server 104, or any combination thereof.

In this example from FIG. 3B, the network edge 102 has generated a false positive indicating that the device 106 is part of a campaign and will receive a device update, even though the device 106 was not actually part of the campaign. This happens when the hash value generated from the identifying information of the requesting device 106 happens to match the hash value of a different device that is actually part of the campaign represented by the filter data structure. As discussed above, this false positive error is eventually detected when the campaign management service 108 accesses data and status information for a campaign to verify that the requesting device 106 actually is a member of a campaign. Nonetheless, because various embodiments of the filter device 114 do not ever return false-negative membership responses to a device 106 that is not part of a campaign, the overall performance of the filter device 114 reduces the latency experienced by requesting devices 106 and reduces end-to-end resource usage and processing time by significantly reducing a number of device update requests (especially the number of non-campaign-member requests) transmitted to and processed by the campaign management service 108.

Figure 4:
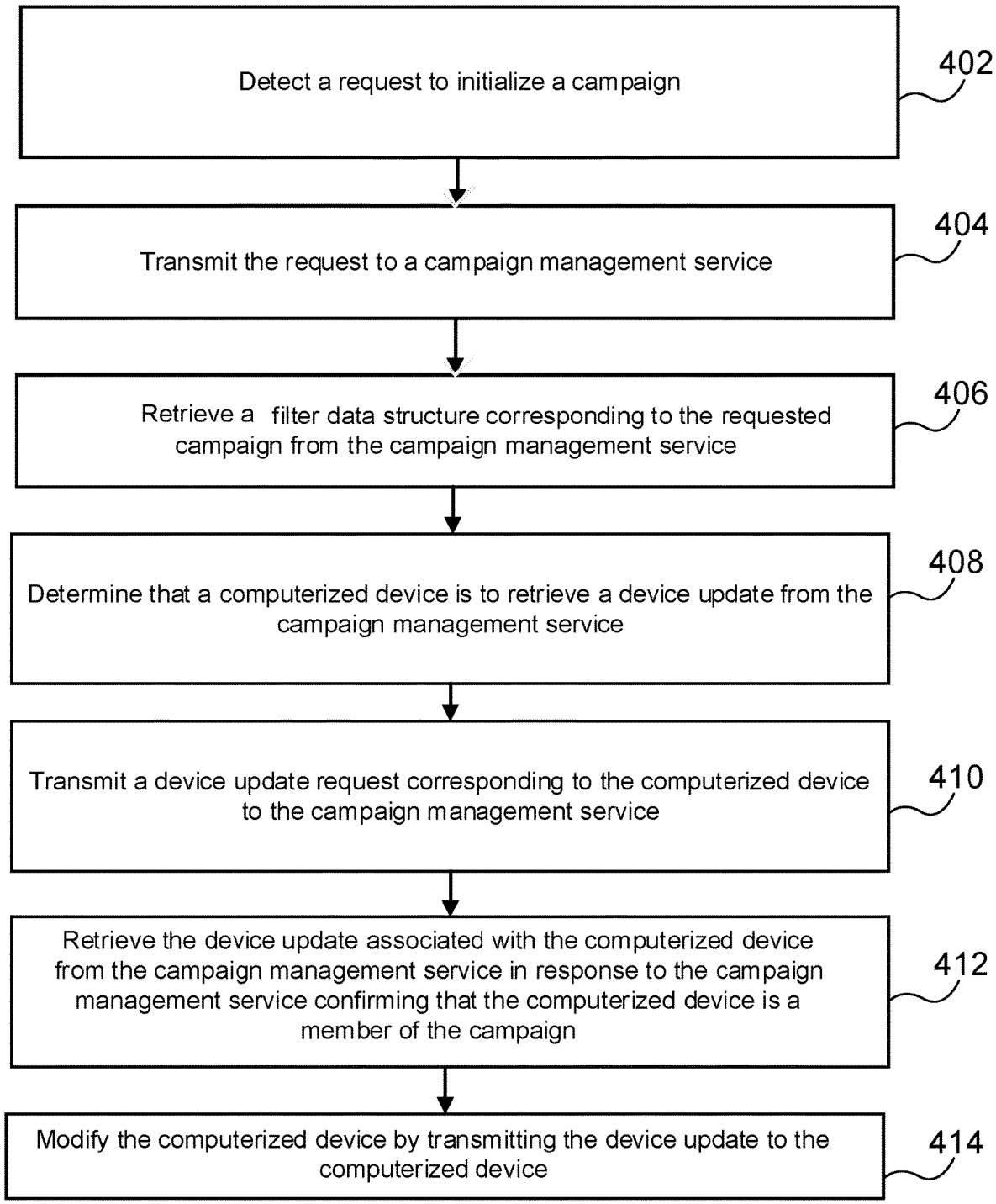
FIG. 4 is a process flow diagram of an example method for managing campaign related requests with a network edge, consistent with example embodiments described herein.

FIG. 4 is a process flow diagram for an example method that can manage campaign related requests with a network edge. In some embodiments, the method 400 can be implemented with any suitable number of computing devices, such as the network edge 102, the device management server 104, the filter device 114, the network edge 602, the campaign service 608, or any combination thereof.

As shown this example, at block 402, a network edge can detect a request to initiate a campaign for device updates. In some embodiments, any suitable server, web based interface, device, or computerized device can initiate a campaign by providing a list or set of computerized devices that are in or that belong to the campaign, along with data such as the campaign start date and campaign end date, where the computerized devices in the list or set are each identified by identifying information, in the present example, a unique identifier, such as a vehicle identification number, a product serial number, a product model number, or the like. In some embodiments, a uniform resource locator for the network edge is stored in protected memory of each computerized device (e.g., computerized device 106) requesting a device update. The uniform resource locator can enable the computerized devices to securely contact a predetermined authorized network edge.

At block 404, the network edge can transmit the request to a campaign management service (e.g., campaign management service 108). In some embodiments, the network edge can transmit the request via a messenger device or service (e.g., message service 116) to a campaign management service. The messenger device can support asynchronous or synchronous communications. For example, the messenger device can store any number of requests and transmit the requests to the campaign management service at a later time. In some embodiments, the messenger device can transmit requests for any number of campaigns from one or more network edges to one or more campaign management services.

At block 406, the network edge can receive, retrieve, obtain, or otherwise access a filter data structure corresponding to the requested campaign from the campaign management service. For example, following the processing of the request to initialize a campaign by the campaign management service, the network edge can receive or retrieve the filter data structure generated by the campaign management service. In some embodiments, the filter data structure can be stored within the network edge in a device management server that communicates with computerized devices. In some examples, the filter data structure can be stored within the network edge in a separate device (e.g., filter device 114) that is accessible to the device management server.

During operation, the device management server can receive or detect requests from computerized devices attempting to determine whether device updates for a campaign are available for the requesting devices. The device management server can query the filter data structure stored locally or in a separate filter device to determine either that the computerized device is not a member of the campaign or that the computerized device may be a member of the campaign, subject to a possible, low-probability, false positive.

At block 408, the network edge can determine that a computerized device probably has a device update available from the campaign management service based on a hash value associated with the computerized device matching a hash value stored in the filter data structure, where the stored hash value was identified by querying the filter data structure as mentioned above. On the other hand, when the requesting computerized device is not part of a campaign/does not have any updates available for it, then the network edge can return a negative response to the computerized device. This occurs when the hash value associated with the computerized device does not match any of the hash values stored in the filter data structure.

In some embodiments, the network edge can generate any number of hash values from identifying information for a computerized device and compare the hash values to values stored and mapped in the filter data structure. For example, depending on a number of hash functions implemented in the filter data structure, a corresponding number of hash values for a computing device. In the case of a bloom filter data structure implementing five hash functions, filter structure may store five or more hash values based on output from the identifying information of a computerized device applied to the five or more separate hash functions. In a cuckoo filter implementation utilizing two hash functions, two hash values for each computing device may be stored in filter data structure. However, in an Xor filter structure utilizing three hash functions, because the outputs of these hash functions are aggregated in an Xor, only a single hash value for a computing device need be stored, leading to a very dense filter data structure. In some embodiments, any number of hash functions can be used to generate the hash values stored in the filter data structure.

At block 410, the network edge can transmit a device update request corresponding to the computerized device to the campaign management service. In some embodiments, the network edge can forward a device update request to the campaign management service in response to detecting one or more hash values corresponding to the identifying information for a requesting device that matches a hash value in the filter data structure. In some examples, transmitting the device update request to the campaign management service can enable verifying that the computerized device belongs to a campaign, as opposed to being a false positive.

At block 412, the network edge can receive, retrieve or otherwise obtain the device update associated with the requesting computerized device from the campaign management service, in the case where the campaign management service has verified, confirmed, or determined that the computerized device is indeed a member of the campaign. In some embodiments, the campaign management service can verify that a computerized device is a member of the campaign based on stored data corresponding to the campaign. For example, the data can include a list of identifying information for computerized devices that can retrieve device updates as part of the campaign, (i.e., a list of identifiers corresponding to the computerized devices that are included in the campaign); and the campaign management service may determine that the requesting device is on the list. In some embodiments, the network edge can received or retrieve the device update from the campaign management service directly or via a messenger device, or from any other suitable computing device.

At block 414, the network edge can update, revise, provision or modify the computerized device by transmitting the device update, which came from the campaign management service, to the computerized device. In some embodiments, the device update can modify software, firmware, and the like, stored within the computerized device. The network edge can transmit or otherwise supply the device update to the computerized device, and the computerized device may automatically install the device update when it is received. In some examples, the device update can modify the computerized device by installing new applications, modifying existing applications, updating firmware drivers that control hardware components, and the like.

The process flow diagram of FIG. 4 is not intended to indicate that the operations of the method 400 are to be executed in any particular order, or that operations cannot be executed concurrently, or that all of the operations of the method 400 are to be included in every case. Additionally, the method 400 can include any suitable number of additional operations. For example, the method 400 can also include the computerized device and the campaign management service exchanging mutual transport layer security certificates prior to retrieving a device update. In some embodiments, the network edge may not detect a request to initialize a campaign and transmit the request to a campaign management service. For example, an external server, web based interface, and the like, may initialize a campaign by transmitting data for the campaign directly to the campaign management service without accessing the network edge.

Figure 5:
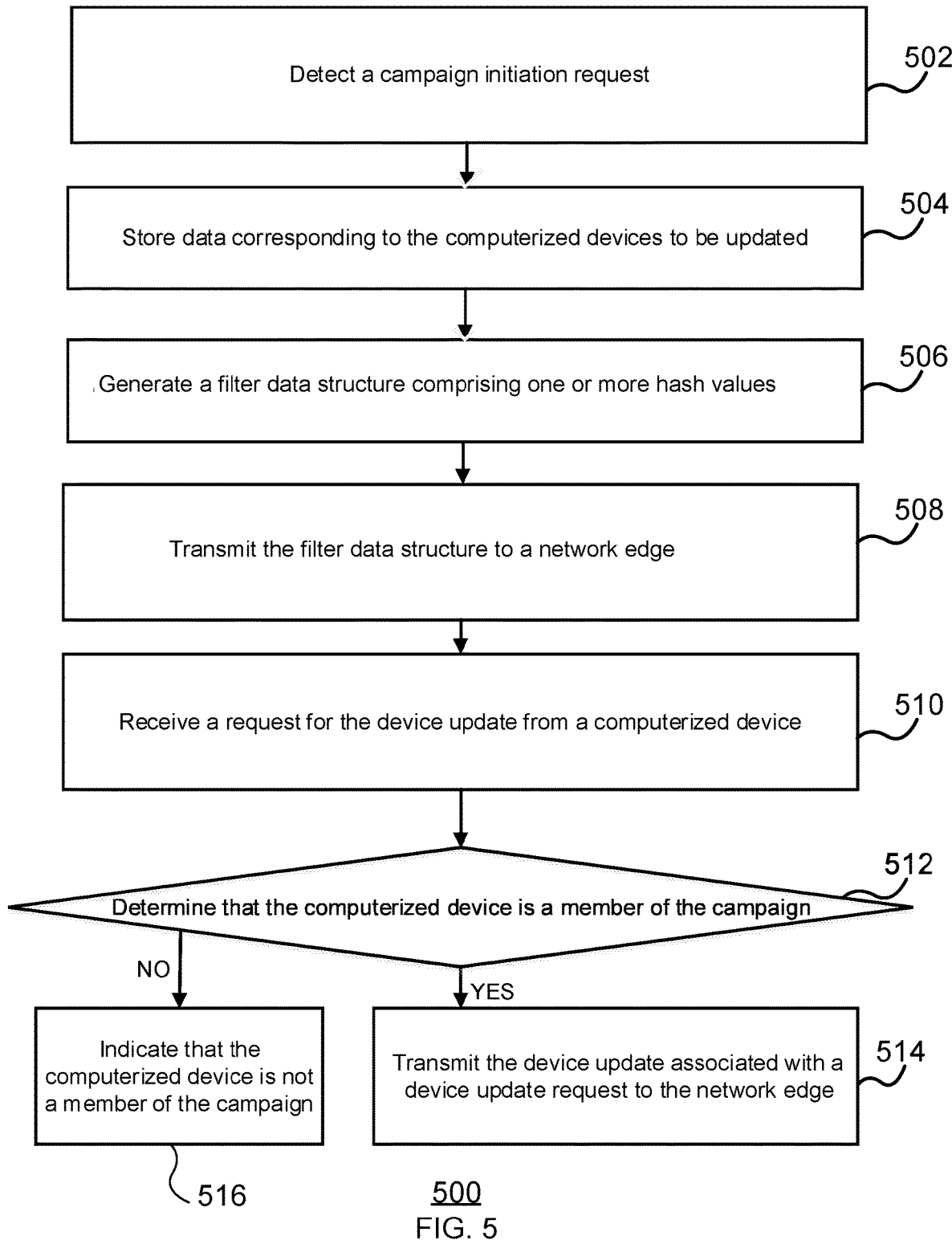
FIG. 5 is a process flow diagram for an example method that can manage campaign related requests with a campaign management service, consistent with example embodiments described herein.

FIG. 5 is a process flow diagram for an example method that can manage campaign related requests with a campaign management service. In some embodiments, the method 500 can be implemented with any suitable number of computing devices, such as the campaign management service 108, the database 112, internal services 110, the campaign service 608, or any combination thereof.

At block 502, the campaign management service can receive or detect a campaign initiation request indicating a number of computerized devices to be updated for a campaign. In some embodiments, the campaign management service can detect the campaign initiation request from a network edge or from a messenger device that provides asynchronous or synchronous messages from the network edge. In some embodiments, the campaign management service can detect the campaign initiation request directly from a web based interface, a device that manages campaigns, and the like. As discussed above, the campaign initiation request can include identifying information for each device that is supposed to receive a device update as part of a campaign, a start date or time for the campaign, and an end date or time for the campaign, and the like.

At block 504, the campaign management service can store data corresponding to the computerized devices to be updated. In some embodiments, the campaign management service can store the data corresponding to the computerized devices to be updated locally or in an external database. In some implementations, the campaign management service can analyze, search, or query the data to determine whether a computerized device belongs to a campaign. For example, if the campaign management service later detects a request for a device update from a computerized device having a unique identifier, the campaign management service can analyze, search, or query the data to determine whether that device, (e.g., whether that unique identifier), is included in the campaign, such that a device update is to be provided to that computerized device.

At block 506, the campaign management service can generate a filter data structure that represents the computerized devices that are included in the campaign and thus are to be provided with the campaign's device update(s). In various implementations, the filter data structure includes one or more hash values, where the hash values are generated from the unique identifiers (or other identifying information) for each of the computerized devices that are part of the campaign. In some examples, the filter data structure can include a hash value based on the data or identifying information for each of the computerized devices to be updated, the hash value being mapped to one or more locations in a hash table.

In some embodiments, the filter data structure can include any number of hash values based on the identifying information for each computerized device to be updated. For example, the filter data structure can include an array, linked list, vector, and the like, which can store any number of hash values. In some embodiments, the identifying information for each computerized device is applied to any number of hash functions and each hash function generates an output bit or series of bits stored in the filter data structure enabling mapping of the computerized device to one or more array locations. In some embodiments, the campaign management service can generate the filter data structure based on a union operation applied to a plurality of groups of computerized devices to be included in the campaign.

At block 508, the campaign management service can transmit or otherwise provide the filter data structure to a network edge, e.g., after initialization of the filter data structure. In some embodiments, the campaign management service can transmit the filter data structure to the network edge via an asynchronous messenger device (e.g., the message server 116). For example, the asynchronous messenger device can receive the filter data structure and then delay transmitting the filter data structure to the network edge until a later time or date, which can improve communications via network interfaces with have high latency and/or low bandwidth limitations.

At block 510, the campaign management service can receive a request for a device update from a computerized device. In some embodiments, the campaign management service can receive requests for device updates only after the network edge has determined that the computerized device corresponding to the request probably (except for false positives) belongs to a campaign based on the filter data structure that the campaign management service provided to the network edge at block 508. In some such embodiments, the network edge forwards requests for device updates to the campaign management service only when a hash value generated or derived from the identifying information for the requesting computerized devices matches a hash value stored in the filter data structure. As discussed above, when a hash value generated or derived from the identifying information for the requesting computerized devices is not present in the filter data structure, then the network edge does not contact the campaign management service, and instead provides an accurate "no update" response to the computerized device that request a device update, but is not included in a campaign.

At block 512, the campaign management service can confirm, verify, or otherwise determine that the computerized device is a member of the campaign. In some embodiments, the campaign management service can compare the identifying information of the computerized device that has requested a device update to data stored for a campaign (e.g., locally or in a database) to determine whether the campaign data indicates that the computerized device is part of the campaign. In various implementations, the identifying information of the computerized device is included in the request. As a more specific example, the campaign management service can search for the unique identifier of the computerized device, such as the device's serial number, in a list of unique identifiers (e.g., serial numbers) that is part of the campaign data, where the list of unique identifiers in the campaign data includes all of the devices that are part of the campaign.

At block 514, the campaign management service can transmit the device update associated with a device update request (and with the campaign) to the network edge, after determining that the computerized device is indeed a member of the campaign. In some examples, the device update can be code, instructions, binaries, or the like that add to, replace, and/or modify firmware, software, or any combination thereof stored on the computerized device.

If, at block 512, the campaign management service does not confirm, verify, or otherwise determine that the computerized device is a member of the campaign, then the campaign management service does not perform the operation of block 514. In various implementations, the campaign management service may determine that the computerized device is not a member of the campaign because the computerized device (e.g., the identifying information of the computerized device) is not listed, identified, or otherwise represented in the campaign data.

In some implementations, if, at block 512, the campaign management service does not confirm, verify, or otherwise determine that the computerized device is a member of the campaign, then the campaign management service, at block 516, transmits or otherwise provides or indicates to the network edge a message or the like indicating that the requesting device is not part of the campaign and/or that there are no updates for the requesting device.

The process flow diagram of FIG. 5 is not intended to indicate that the operations of the method 500 are to be executed in any particular order, or that operations cannot be executed concurrently, or that all of the operations of the method 500 are to be included in every case. Additionally, the method 500 can include any suitable number of additional operations. For example, the campaign management service can direct the network edge to delete the filter data structure when the campaign has ended (e.g., when the end date for the campaign occurs), for example, by sending a message to the network edge to flush a cache or memory device storing the filter data structure, where the message may be triggered in response to the end of the campaign.

Figure 6:
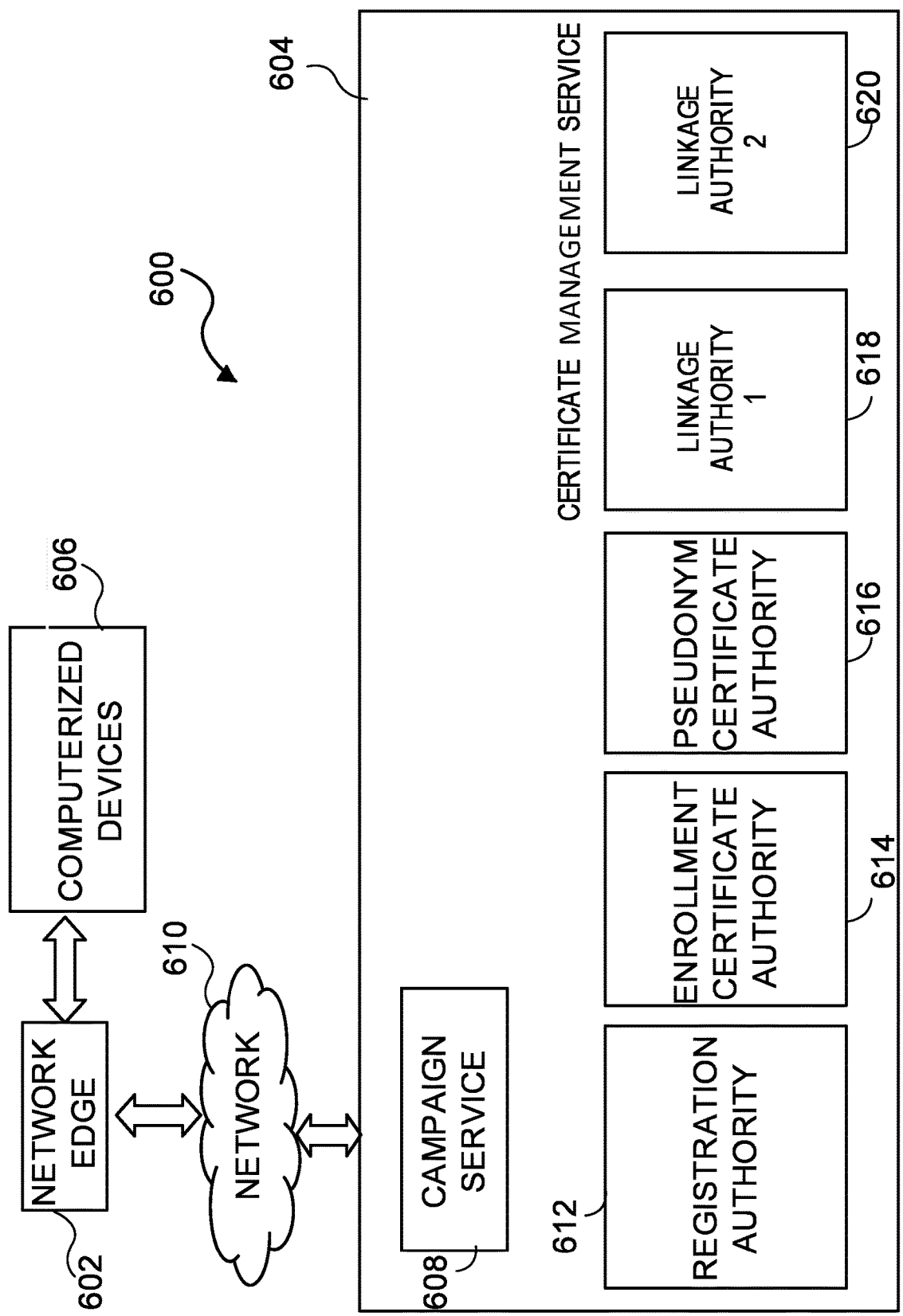
FIG. 6 is a data flow diagram illustrating example data flows between a computerized device, a campaign management service, and a certificate management service, consistent with example embodiments described herein.

FIG. 6 depicts an example operating environment 600 where a network edge 602 interacts with a certificate management service 604, which is an example of one type of service for providing digital assets. In some implementations, the certificate management service 604 may be a V2X certificate management service. In additional or alternative implementations, the certificate management service 604 may be a C2X certificate management service and may be implemented as a server(s), one or more virtual machines on one more computing devices, or the like. As shown, the network edge 602 can submit a request for device updates, such as certificates, and the like, for one or more computerized devices 606 to the certificate management service 604 via a campaign service 608 and a network 610, such as the internet. In some embodiments, the device updates can enable execution of applications on the computerized devices 606 in a secure environment. For example, the device updates can include certificates that enable computerized devices 606 to securely transmit communications with additional computerized devices in a runtime environment.

In certain implementations, the computerized devices 606 correspond to one or more of a vehicle, a watercraft (e.g., a boat), an aircraft, a spacecraft, a medical device, a robot, a drone, a wireless or wired communication module, and an IoT device. For example, the computerized devices 606 can correspond to an OBU or an ECU of a vehicle, a watercraft, an aircraft, a spacecraft, a robot, a drone, a medical device, or an IoT device. Also, for example, the computerized devices 606 can correspond to an RSU of a traffic control device (e.g., a traffic signal, a traffic light, or electronic traffic signage), a digital billboard, a pedestrian warning system, a motorcycle sensor, a bicycle sensor, an electronic sign, a street light sensor, or a construction warning sensor, among others.

In some embodiments, the network edge 602 can use a filter data structure, as discussed above, to determine if computerized devices 606 are to receive device updates from the certificate management service 604. In some examples, the device updates can include enrollment certificates, pseudonym certificates, firmware, software, and the like. The enrollment certificates can include any suitable digital certificate that enables provisioning a computerized device 606 with device updates such as software updates, firmware updates, or any combination thereof. The pseudonym certificates can include a separate digital certificate that enables the computerized devices 606 to securely exchange data or communications during a runtime environment. In some implementations, the network edge 602 can transmit a response to the computerized devices 606 that are not included in a device update campaign. For example, hash values based on the identifying information of the computerized devices 606 may not match hash values stored in a filter data structure associated with the device update campaign. In some examples, the network edge 602 can determine that one or more of the computerized devices 606 are included in the device update campaign. The network edge 602 can transmit a request for the device updates via the campaign service 608 to the registration authority 612, the enrollment certificate authority 614, the pseudonym certificate authority 616, or any combination thereof.

In the operating environment 600, the request for device updates or certificates is received by the campaign service 608 from the network edge 602 via any suitable interface. For example, the campaign service 608 can implement an API based on a client representational state transfer (REST) protocol, or a simple object access protocol (SOAP), among others. As shown in FIG. 6, the campaign service 608 can implement a public or private API, and the certificate management service 604 can be a V2X or C2X certificate management service. The certificate management service 604 accepts the request for device updates, completes the task within a timeframe, and then returns the results (e.g., the generated device updates or certificates) to the network edge 602 via the campaign service 608 and the network 610. In some implementations, the timeframe can be a number of minutes, hours, or days, depending on the processing capacity of the certificate management service 604, among other things.

The certificate management service 604 includes components for generating the requested device updates. In the example of FIG. 6, these components include a registration authority 612, an enrollment certificate authority 614, a pseudonym certificate authority 616, a linkage authority 1 618, and a linkage authority 2 620.

In additional or alternative implementations, the components of the certificate management service 604 may vary depending on whether the certificate management service 604 is configured as a V2X or C2X certificate management service. For example, in cases where the certificate management service 604 functions as a C2X certificate management service, the certificate management service 604 can include a Long Term Certificate Authority (LTCA) configured to fulfill a role similar to that of the enrollment certificate authority 614. Similarly, when the certificate management service 604 is embodied as a C2X certificate management service, the certificate management service 604 can include an Authorization Authority (AA) that fulfills a role similar to that of the pseudonym certificate authority 616. The components of the certificate management service 604 are described in the following paragraphs.

In an example, the certificate management service 604 can be embodied as a CMS. Various implementations of the certificate management service 604 may be used for extremely high volume device transaction and certificate generation processing. In various implementations, the certificate management service 604 may be implemented using multiple servers, multiple hardware security modules (HSMs), multiple compute or computing engines, and multiple application platforms. In an example implementation, the application platforms may each include one or more virtual machines (VMs) for hosting the registration authority 612, the enrollment certificate authority 614, the pseudonym certificate authority 616, and the linkage authorities 618 and 620. In additional or alternative implementations, the application platforms may each include one or more hardware platforms, such as, for example, application servers, computers, or other computer hardware capable of hosting and executing a software application. In the example of FIG. 6, the application platform for the enrollment certificate authority 614 may be one or more VMs that run an application for the enrollment certificate authority 614, the application platform for a pseudonym certificate authority 616 may be one or more VMs operable to host and run an application for the pseudonym certificate authority 616. Similarly, the application platform for a linkage authority 1 618 may be one or more VMs configured to host and run a linkage authority 1 application, and the application platform for a linkage authority 2 620 may be one or more VMs operable to host and run a linkage authority 2 application. Non-limiting examples of the certificate management service 604 may be implemented in a private data center, a cloud data center such as, for instance, Amazon web services (AWS) from Amazon, or in a hybrid of private and cloud data centers.

In some implementations, the certificate management service 604 may provide device updates including security certificates, such as enrollment certificates and pseudonym certificates, to be used by a distributor appliance or network edge 602 of a manufacturer. In certain implementations, the certificate management service 604 may interact with a digital asset management system (DAMS, not shown) in order to provide certificates to a distributor appliance (not shown).

As illustrated in FIG. 6, the architecture of the certificate management service 604 includes a registration authority 612, the enrollment certificate authority 614, the pseudonym certificate authority 616, the linkage authority 1 618, and the linkage authority 2 620. Each of these components may utilize respective, dedicated compute engines (not shown) to perform tasks. For example, the registration authority 612 can utilize a registration authority compute engine, the enrollment certificate authority 614 can utilize an enrollment certificate authority compute engine, the pseudonym certificate authority 616 can utilize a pseudonym certificate authority compute engine, the linkage authority 1 618 can utilize a linkage authority 1 compute engine, and the linkage authority 2 620 can utilize linkage authority 2 compute engine. The functionalities of each of these components are described in the following paragraphs.

In some embodiments, the architecture of the certificate management service 604 advantageously separates the non-security-related applications from the security functions. As shown in the example of FIG. 6, the registration authority 612, the enrollment certificate authority 614, the pseudonym certificate authority 616, and the linkage authorities 618, 620 are implemented as applications on their own VMs, which execute on their own dedicated compute engines, all of which are separate from any non-security-related applications and functions. This provides both a technical and security advantage and improvement over conventional systems, in which the performance of the HSMs is slow or in which the cloud service provider cannot supply HSMs or in which their proper management of the HSMs is uncertain. In the certificate management service 604, the cryptographic operations that utilize an HSM are performed in a compute engine (e.g., one or more of compute engines).

By separating the critical security functions from each other and onto separate compute engines, as shown in FIG. 6, the computation-intensive crypto and security functions (e.g., an elliptic curve butterfly expansion computation or an elliptic curve digital signature), for instance, as performed by the registration authority 612, the enrollment certificate authority 614, the pseudonym certificate authority 616, and the linkage authorities 618, 620, are performed significantly faster than existing conventional registration authority systems. This design, in conjunction with the campaign service 608 described below, enables significant improvements in transaction processing in a multi-client environment by preventing any technical performance issues related to the network 610 from interfering or delaying the provisioning of the computerized devices 606 with digital assets retrieved from the certificate management system 604. For example, the campaign service 608 can determine which computerized devices 606 belong to a device update campaign and transmit requests for the device updates. Accordingly, the campaign service 608 can determine if a computerized device 606 belongs to a device update campaign and, if so, provide the retrieved device updates, such as enrollment certificates and pseudonym certificates, to the computerized devices 606 during the provisioning process or at a later time. In some examples, the campaign service 608 can avoid bandwidth issues, network connectivity issues, and the like, while provisioning computerized devices 606. For example, the campaign service 608 can prevent a large number of computerized devices 606 from querying the registration authority 612 for device updates. The campaign service 608 can also process requests for device updates quickly with less data storage by storing hash values in a filter data structure, wherein the hash values can be based on identifying information from the computerized devices 606 that belong to a campaign. Furthermore, the campaign service 608 can, in some examples, retrieve the enrollment certificates and the pseudonym certificates synchronously or asynchronously from the CMS 604 and synchronously or asynchronously provide the enrollment certificates and the pseudonym certificates to the computerized devices 606. In some examples, the asynchronous retrieval and distribution of the enrollment certificates and pseudonym certificates can further reduce the time of the provisioning process for each computerized device. As such, implementations consistent with the present disclosure provide a particular, technically advantageous system architecture to determine the computerized devices 606 that are to retrieve device updates as part of a campaign and retrieve the device updates, such as digital assets, from the certificate management system 604.

In some embodiments, if the scale of the registration authority application executed by the registration authority 612 is to be modified, additional VMs can be added while no change may be required in the secure compute capability of the registration authority compute engine(s). Alternatively, if the security computations are limiting performance, additional secure registration authority compute engines can be added. This same multi-dimensional scaling is true for the other components of the certificate management service 604. These capabilities provides significant performance improvements and scalability over existing conventional Certificate management services (CMS). In some implementations, the respective application platforms for the registration authority 612, the enrollment certificate authority 614, the pseudonym certificate authority 616, and the linkage authorities 618, 620 are communicatively connected to compute engines via respective sets of input message queues so that these components of the certificate management service 604 can all scale independently from each other.

As noted above and shown in the non-limiting example of FIG. 6, each of the registration authority 612, the certificate authorities 614, 616, and the linkage authorities 618, 620 may be implemented as applications on their own virtual machines (VMs). In additional or alternative implementations, one or more of the registration authority 612, the certificate authorities 614, 616, and the linkage authorities 618, 620 can execute on hardware platforms (e.g., servers or compute engines). The roles and functionalities of each of these applications executing on application platforms (e.g., VMs or hardware platforms) are described in the following paragraphs.

In various implementations, the registration authority 612 can be the authority in a provisioning network that verifies user requests for a digital certificate, or other type of digital security asset, and enable a certificate authority, (e.g., the enrollment certificate authority 614 and the pseudonym certificate authority 616) to issue the digital certificate. In various implementations, the registration authority 612 can implement any suitable public key infrastructure (PKI) techniques. In various implementations, the campaign service 608 can pass certificate requests to the registration authority 612, which can be implemented as a representational state transfer (REST) web service, or a SOAP based service, among others. In various implementations, there may be multiple instances of the registration authority 612 executing at the same time. This is similarly represented for the other components of the certificate management service 604 shown in FIG. 6. The registration authority functionality of the certificate management service 604 is non-centralized in that its functionality can be carried out by multiple instances of the registration authority 612 implemented as a REST web service. One role for the registration authority 612 is to grant and fulfill certificate provisioning requests while preventing the signing pseudonym certificate authority 616 from determining which certificates are to be stored in a particular computerized device. The registration authority 612 can interact directly with the pseudonym certificate authority 616, and the linkage authorities 618, 620 via message queues in order to fulfill their roles within the certificate management service 604.

In certain implementations, the registration authority 612 (and the other components of FIG. 6) may be connected to a database (not shown). The certificate management service 604 may utilize a collection of data stores or databases for data storage and retrieval. For example, the database used may consist of one or more database logical or physical units, each with one or more tables enabling data separation where required. As used herein, the term "database" refers to one or more databases or data stores. In certain implementations, the use of multiple databases can allow for data separation between the registration authority 612 other components of FIG. 6. For example, such use of multiple databases allows for data separation between the registration authority 612, the certificate authorities 614, 616, and the linkage authorities 618, 620.

In some embodiments, the database(s) used by the certificate management service 604 is a collection of one or more fast access, low-latency databases. In some implementations, the database(s) may be a NoSQL database or database service, such as, for example, the DynamoDB data service offered by Amazon web services. In various implementations, the data stored in the database is application dependent, but may include past issued certificates, various linkage authority values, data on devices to whom certificates have been issued, operator actions, etc. In some examples, the data can be stored either unencrypted, encrypted, or some combination thereof.

In various implementations, the certificate management service 604 includes an enrollment certificate authority 614 and a pseudonym certificate authority 616, as the digital certificates produced by the registration authority 612 are split into different segments—e.g., an enrollment digital certificate and pseudonym digital certificates. The enrollment certificate authority 614 is a non-central component of the certificate management service 604 as there may be multiple instances of the enrollment certificate authority 614 executing at the same time. For instance, in some implementations, there may be may be multiple instances of the enrollment certificate authority 614 executing simultaneously. The enrollment certificate authority 614 can receive requests for enrollment certificates from the registration authority 612. One role of the enrollment certificate authority 614 is to fulfill requests from the registration authority 612 to issue enrollment certificates to end-devices, such as, for example, a distributor appliance. In some embodiments, the enrollment certificate authority 614 interacts directly with the registration authority 612 in order to fulfill its role within the CMS 604.

The pseudonym certificate authority 616 is a non-central component of the CMS in that there may be multiple instances of the pseudonym certificate authority 616 executing simultaneously. For the pseudonym certificate authority 616, in various implementations, there may be multiple instances of the pseudonym certificate authority 616 executing in parallel at the same time. The pseudonym certificate authority 616 may receive requests for pseudonym certificates from the registration authority 612. A role of the pseudonym certificate authority 616 is to fulfill requests from the registration authority 612 to issue pseudonym certificates to end-devices, such as, for example, a computerized device 606. In certain implementations, the pseudonym certificate authority 616 fulfills requests for short-term pseudonym certificates for V2V functionality. In some embodiments, the pseudonym certificate authority 616 interacts directly with the registration authority 612 in order to fulfill its functions within the CMS 604.

In various implementations, the linkage authorities 618, 620 shown in FIG. 6 link the identity of the certificate requestor (i.e., a unique identifier of the certificate requestor's device), to an issued pseudonym certificate for revocation purposes. That is, the linkage authority 1 618 and linkage authority 2 620 provide respective linkage values as unique identifiers of the certificate requestor's device to the issued pseudonym certificate. The linkage authority 1 618 and linkage authority 2 620 can receive requests for linkage values from the registration authority 612, and then provide the requested linkage values to the registration authority 612. The linkage authorities 618, 620 interact directly with the registration authority 612 in order to fulfill requests for linkage values.

In various implementations, the compute engines of the CSM 604 can include HSMs, which allow these components to perform secure computations without being unduly threatened from hackers. In some implementations, the compute engines may be designed to perform secure computations themselves without requiring an embedded HSM—in such implementations, they embody the HSM.

In various implementations, different HSM versions may be used in the CMS 604. For example, the HSMs may include embedded HSMs installed as plug-in cards within one or more of the compute engines. In such example implementations, the embedded HSMs may be installed in one or more of the compute engines as Peripheral Component Interconnect (PCI) HSMs or PCI Express (PCIe) HSMs. Also, for instance, the HSMs in the certificate management service 604 may include external, network-attached or network-connected HSMs that are separate from compute engines in their own enclosures.

One of ordinary skill will recognize that the components and implementation details shown in FIG. 6 are examples presented for conciseness and clarity of explanation. Other components, processes, implementation details, and variations may be used without departing from the principles of the techniques described herein, as this example is not intended to be limiting and many variations are possible.

Figure 7:
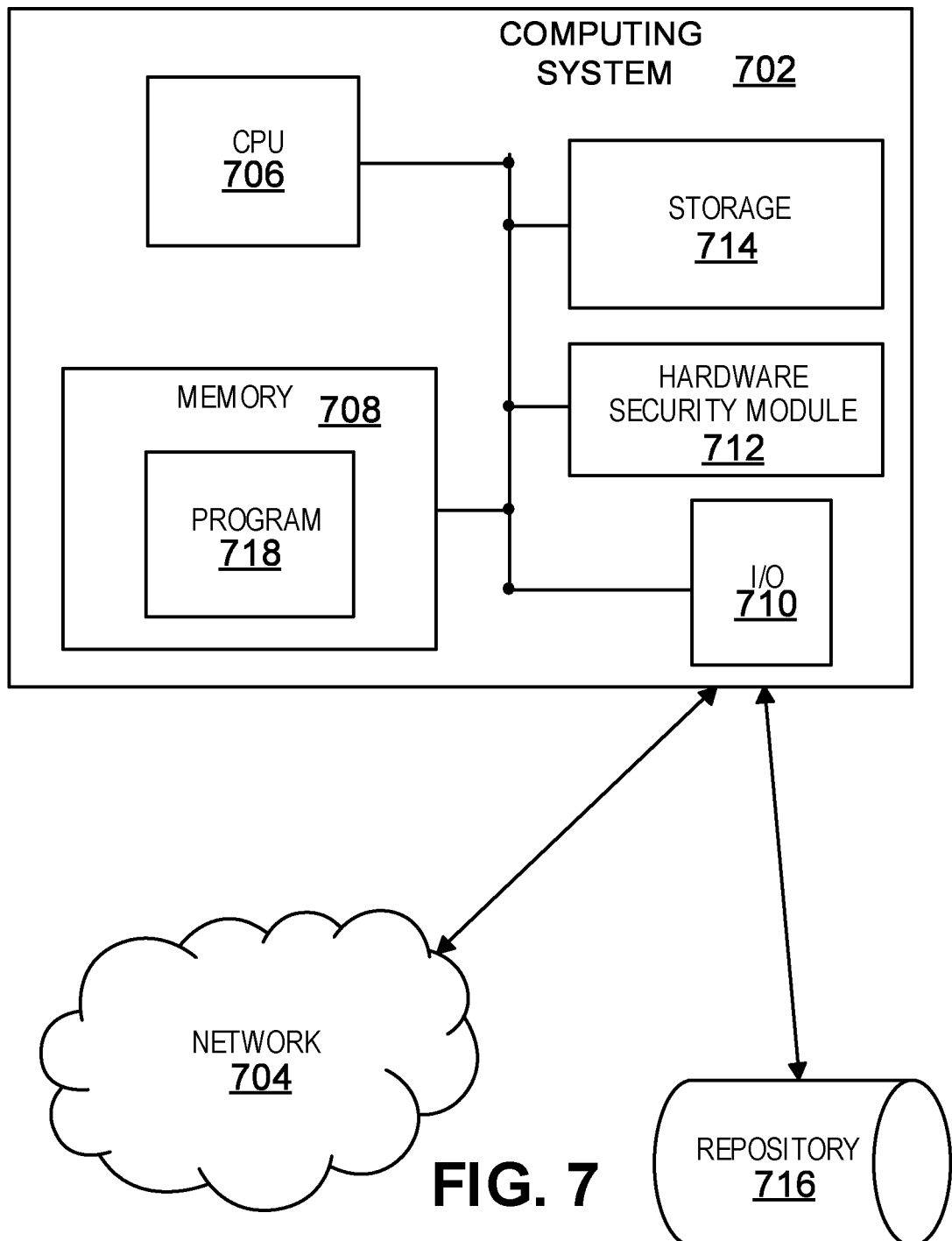
FIG. 7 is a block diagram of an example of a computing system that can host systems and methods consistent with example embodiments described herein.

FIG. 7 is a block diagram of an example of a computing environment 700, which includes a computing system 702 that may be used for implementing systems and methods consistent with implementations of the present techniques. Other components and/or arrangements may also be used. In some implementations, computing system 702 may be used to implement, at least partially, various components of FIGS. 1-6, such as the network edge 102, the campaign management service 108, the network edge 602, or the campaign service 608, among other things. In some implementations, a series of computing systems similar to computing system 700 may be each customized with specialized hardware and/or programmed as a specialized server to implement one of the components of FIGS. 1-6, which may communicate with each other via a network 704.

In the example shown in FIG. 7, the computing system 700 includes a number of components, such as a central processing unit (CPU) 706, a memory 708, an input/output (I/O) device(s) 710, a hardware security module (HSM) 712, and a nonvolatile storage device 714. System 700 can be implemented in various ways. For example, an implementation as an integrated platform (such as a server, workstation, personal computer, laptop, etc.) may comprise a CPU 706, a memory 708, a nonvolatile storage 714, and I/O devices 710. In such a configuration, the components 706, 708, 714, and 710 may connect and communicate through a local data bus and may access a data repository 716 (implemented, for example, as a separate database system) via an external I/O connection. The I/O component(s) 710 may connect to external devices through a direct communication link (e.g., a hardwired or local Wi-Fi connection), through a network, such as a local area network (LAN) or a wide area network (WAN, such as a cellular telephone network or the Internet), and/or through other suitable connections. System 700 may be standalone or it may be a subsystem of a larger system.

The CPU 706 may be one or more known processor or processing devices, such as a microprocessor from the Core™ family manufactured by the Intel™ Corporation of Santa Clara, Calif. or a microprocessor from the Athlon™ family manufactured by the AMD™ Corporation of Sunnyvale, Calif. The memory 708 may be one or more fast storage devices configured to store instructions and information executed or used by the CPU 706 to perform certain functions, methods, and processes related to implementations of the present techniques. The storage 714 may be a volatile or non-volatile, magnetic, semiconductor, tape, optical, or other type of storage device or computer-readable medium, including devices such as CDs and DVDs and solid state devices, meant for long-term storage.

In the illustrated implementation, the memory 708 contains one or more programs or applications 718 loaded from the storage 714 or from a remote system (not shown) that, when executed by the CPU 706, perform various operations, procedures, processes, or methods consistent with the present techniques. Alternatively, the CPU 706 may execute one or more programs located remotely from the system 700. For example, the system 700 may access one or more remote programs via the network 704 that, when executed, perform functions and processes related to implementations of the present techniques.

In one implementation, the memory 708 may include a program(s) 718 for performing the specialized functions and operations described herein for the network edge 102, and/or the campaign management server 108. In some implementations, the memory 708 may also include other programs or applications that implement other methods and processes that provide ancillary functionality to the present techniques. In some examples, the memory 708 can include any suitable non-transitory computer-readable media. For example, the non-transitory computer-readable media can include computer-executable instructions that direct the CPU 706 to execute instructions according to techniques described herein.

The memory 708 may be also be configured with other programs (not shown) unrelated to the present techniques and/or an operating system (not shown) that performs several functions well known in the art when executed by the CPU 706. By way of example, the operating system may be Microsoft Windows™, Unix™, Linux™' an Apple Computers™ operating system, or other operating system. The choice of operating system, and even the use of an operating system, is not critical to the present techniques.

The HSM 712 may be a device with its own processor that securely generates and stores digital security assets and/or securely performs a variety of cryptographic and sensitive computations. The HSM 712 protects digital security assets, such as cryptographic keys, and other sensitive data from possible access by an attacker. In some implementations, the HSM may be a plug-in card or board that attaches directly to the computing system 700.

The I/O device(s) 710 may comprise one or more input/output devices that allow data to be received and/or transmitted by the system 700. For example, the I/O device 710 may include one or more input devices, such as a keyboard, touch screen, mouse, and the like, that enable data to be input from a user. Further, the I/O device 710 may include one or more output devices, such as a display screen, a CRT monitor, an LCD monitor, a plasma display, a printer, speaker devices, and the like, that enable data to be output or presented to a user. The I/O device 710 may also include one or more digital and/or analog communication input/output devices that allow the computing system 700 to communicate, for example, digitally, with other machines and devices. Other configurations and/or numbers of input and/or output devices may be incorporated in the I/O device 710.

In the implementation shown, the system 700 is connected to a network 704 (such as the Internet, a private network, a virtual private network, a cellular network or other network or combination of these), which may in turn be connected to various systems and computing machines, such as servers, personal computers, laptop computers, client devices, etc. In general, the system 700 may input data from external machines and devices and output data to external machines and devices via the network 704.

In the example implementation shown in FIG. 7, the data repository or data source 716 is a standalone database external to system 700. In other implementations, the data source 716 may be hosted by the system 700. In various implementations, the data source 716 may manage and store data used to implement systems and methods consistent with the present techniques. For example, the data source 716 can manage and store data structures that include the identifying information or data for each computerized device of a campaign, and the like. The data source 716 can also manage and store the filter data structure that includes hash values based on the identifying information applied to any number of hash functions.

In some embodiments, the data source 716 may comprise one or more databases that store information and are accessed and/or managed through the system 700. By way of example, the database 716 may be an Oracle™ database, a Sybase™ database, or other relational database. Systems and methods consistent with the present techniques, however, are not limited to separate data structures or databases, or even to the use of a database or data structure.

One of ordinary skill will recognize that the components and implementation details of the system in FIG. 7 are examples presented for conciseness and clarity of explanation. Other components and implementation details may be used.

Although the foregoing examples use specific examples of computerized devices, such a OBUs, ECUs, and RSUs, for clarity of explanation, the present techniques are not limited to those specific examples. Various implementations consistent with the present techniques may be used with and for a wide variety of computerized devices, such as medical device (e.g., dialysis machines, infusion pumps, etc.); robots; drones; autonomous vehicles; and wireless communication modules (e.g., embedded Universal Integrated Circuit Cards (eUICC)), among others.

Other implementations of the present techniques will be apparent to those skilled in the art from consideration of the specification and practice of the techniques disclosed herein. Various modifications of the illustrative embodiments, as well as other embodiments of the subject matter that are apparent to persons skilled in the art to which the disclosed subject matter pertains, are deemed to lie within the scope of the disclosed subject matter.

What is claimed is:

1. A system for providing updates to computerized devices, the system comprising:
 a campaign management service comprising computer-executable instructions that cause a first processor to perform operations comprising:
  detecting a campaign initiation request indicating a set of computerized devices to be updated for a campaign;
  generating a filter data structure comprising a plurality of hash values, the plurality of hash values corresponding to the set of computerized devices to be updated, wherein a number of hash functions are used to generate the plurality of hash values for the filter data structure;
  providing the filter data structure, generated based on the number of hash functions, from the campaign management service to a network edge; and
  directing the network edge to delete the filter data structure at an end of the campaign;
 the network edge comprising computer-executable instructions that cause a second processor to perform operations comprising:
  determining that a computerized device is to receive a device update from the campaign management service based on a result returned by the filter structure in response to identifying information provided by the computerized device, the result being based on a membership test performed using one or more of the hash functions of the filter data structure and the identifying information;
  obtaining the device update associated with the computerized device from the campaign management service in response to the campaign management service confirming that the computerized device is a member of the campaign, wherein the device update comprises a digital asset comprising one or more of: software, firmware, or a digital certificate, wherein the digital asset modifies operation of the computerized device; and
  providing the device update to the computerized device, whereby the device update modifies the computerized device.

2. The system of claim 1, wherein the filter data structure comprises a cuckoo filter data structure.

3. The system according to claim 2, wherein the cuckoo filter data structure is a semi-sorted cuckoo filter data structure.

4. The system of claim 1, wherein the filter data structure comprises an Xor filter data structure.

5. The system of claim 1, wherein the network edge further comprises computer-executable instructions that cause the second processor to perform operations comprising:
determining, using the filter data structure, that the computerized device does not belong to the campaign; and
providing, to the computerized device and without communicating with the campaign management service, an indication that there is no device update for the computerized device.

6. The system of claim 1, wherein the computerized device is an internet of things (IoT) device, a consumer appliance, or a vehicle.

7. The system of claim 1, wherein the device update comprises an enrollment certificate or a pseudonym certificate.

8. The system of claim 1, wherein the device update further comprises installation information or an installation script.

9. The system of claim 1, wherein the campaign management service further comprises computer-executable instructions that cause the first processor to perform operations comprising:
storing data corresponding to the computerized devices to be updated.

10. The system of claim 9, wherein the data comprises one or more of: a campaign start date, a campaign end date, a plurality of vehicle identification numbers, a plurality of product serial numbers, and a product model number.

11. The system of claim 9, wherein the campaign management service further comprises computer-executable instructions that cause the first processor to perform operations comprising:
determining whether the computerized device is in the campaign by accessing the data.

12. The system of claim 1, wherein the filter data structure is a constant size regardless of the number of computerized devices in the set.

13. The system of claim 1, wherein the system enables the computerized device to poll the network edge for the device update as the filter data structure is generated.

14. The system of claim 1, wherein each computerized device in the set of computerized devices includes a uniform resource locator for communicating with the network edge.

15. A network edge device comprising computer-executable instructions that cause a processor to perform operations comprising:
obtaining, from a campaign management service, a filter data structure comprising a plurality of hash values, wherein a number of hash functions generate the plurality of hash values for the filter data structure;
determining whether a computerized device is to receive a device update from the campaign management service based on a result returned by the filter structure in response to identifying information provided by the computerized device, the result being based on a membership test performed using one or more of the hash functions of the filter data structure and the identifying information;
in response to determining that the device is to receive a device update from the campaign management service:
transmitting a device update request corresponding to the computerized device to the campaign management service;
obtaining the device update associated with the device update request from the campaign management service after the campaign management service confirms that the computerized device is a member of the campaign, wherein the device update comprises a digital asset comprising one or more of: software, firmware, or a digital certificate, wherein the digital asset modifies operation of the computerized device; and
providing the device update to the computerized device, whereby the computerized device installs the device update; and
in response to determining that the computerized device is not to receive a device update from the campaign management service:
providing, to the computerized device and without communicating with the campaign management service, an indication that there is no device update for the computerized device.

16. The network edge device of claim 15, wherein the filter data structure comprises a cuckoo filter data structure.

17. The network edge device of claim 16, wherein the filter data structure is a semi-sorted cuckoo filter data structure.

18. The network edge device of claim 15, wherein the filter data structure comprises an Xor filter data structure.

19. The network edge of claim 15, wherein the device update comprises an enrollment certificate or a pseudonym certificate.

20. A campaign management service comprising computer-executable instructions that cause a processor to perform operations comprising:
detecting a campaign initiation request specifying a plurality of computerized devices to be updated with a device update for a campaign;
storing data corresponding to the plurality of computerized devices to be updated;
generating a filter data structure comprising a plurality of hash values, wherein each hash value is based on the data for each of the computerized devices in the plurality of computerized devices, wherein a number of hash functions generate the plurality of hash values for the filter data structure;
providing the filter data structure, generated based on the number of hash functions, from the campaign management service to a network edge;
receiving a request for the device update from a computerized device;
confirming whether the computerized device is a member of the campaign based on the data corresponding to the plurality of computerized devices to be updated;
in response to confirming that the computerized device is a member of the campaign:
providing the device update associated with the request to the network edge, the device update to modify electronic data accessed or stored by the computerized device, wherein the device update comprises a digital asset comprising one or more of: software, firmware, or a digital certificate, wherein the digital asset modifies operation of the computerized device; and in response to confirming that the computerized device does not belong to the campaign:
  indicating, to one or more of the network edge and the computerized device that there is no device update for the computerized device.

21. The network edge device of claim 20, wherein the filter data structure comprises a cuckoo filter data structure.

22. The network edge device of claim 21, wherein the filter data structure is a semi-sorted cuckoo filter data structure.

23. The network edge device of claim 20, wherein the filter data structure comprises an Xor filter data structure.

24. The campaign management service of claim 20, wherein the device update comprises an enrollment certificate or a pseudonym certificate.

* * * * *